(12) United States Patent
Iga et al.

(10) Patent No.: US 8,078,988 B2
(45) Date of Patent: Dec. 13, 2011

(54) INFORMATION DISPLAY SYSTEM, APPARATUS AND METHOD OF DISPLAYING ELECTRONIC INFORMATION ACCORDING TO SCHEDULE INFORMATION

(75) Inventors: Soichiro Iga, Tokyo (JP); Tetsuro Nagatsuka, Kanagawa (JP); Makoto Shinnishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1505 days.

(21) Appl. No.: 11/512,294

(22) Filed: Aug. 30, 2006

(65) Prior Publication Data

US 2007/0050226 A1     Mar. 1, 2007

(30) Foreign Application Priority Data

Aug. 31, 2005 (JP) ................. 2005-252215

(51) Int. Cl.
    *G06F 3/048* (2006.01)
(52) U.S. Cl. .................. 715/800; 715/788
(58) Field of Classification Search .......... 715/800, 715/788
    See application file for complete search history.

(56) References Cited

U.S. PATENT DOCUMENTS

| | | | | |
|---|---|---|---|---|
| 5,736,974 A * | 4/1998 | Selker | ........................... | 715/862 |
| 5,835,085 A * | 11/1998 | Eick et al. | ..................... | 715/853 |
| 6,236,330 B1 * | 5/2001 | Cohen | ........................ | 340/691.6 |
| 6,535,233 B1 * | 3/2003 | Smith | .......................... | 715/856 |
| 7,020,845 B1 * | 3/2006 | Gottfurcht et al. | ............ | 715/853 |
| 7,418,671 B2 * | 8/2008 | Hama et al. | .................. | 715/830 |
| 2002/0030702 A1 * | 3/2002 | Gould et al. | .................. | 345/850 |
| 2002/0033849 A1 * | 3/2002 | Loppini et al. | ................ | 345/848 |
| 2002/0055880 A1 * | 5/2002 | Unold et al. | .................... | 705/26 |
| 2002/0077896 A1 * | 6/2002 | Liu et al. | .......................... | 705/14 |
| 2002/0171690 A1 * | 11/2002 | Fox et al. | ....................... | 345/862 |
| 2004/0268393 A1 * | 12/2004 | Hunleth et al. | ................. | 725/44 |
| 2006/0048076 A1 * | 3/2006 | Vronay et al. | ................ | 715/850 |
| 2006/0215888 A1 * | 9/2006 | Habets et al. | ................. | 382/128 |
| 2007/0033515 A1 * | 2/2007 | Sull et al. | .................. | 715/500.1 |
| 2007/0050226 A1 * | 3/2007 | Iga et al. | ........................... | 705/8 |
| 2010/0036739 A2 * | 2/2010 | Barlow et al. | .............. | 705/14.62 |

FOREIGN PATENT DOCUMENTS

| | | |
|---|---|---|
| JP | 02-153415 | 6/1990 |
| JP | 2000-353172 | 12/2000 |
| JP | 2000-354145 | 12/2000 |
| JP | 2001-084275 | 3/2001 |
| JP | 2001-249929 | 9/2001 |
| JP | 2001-338039 | 12/2001 |
| JP | 2001-356750 | 12/2001 |
| JP | 2002-027529 | 1/2002 |
| JP | 2002-034022 | 1/2002 |
| JP | 2002-041535 | 2/2002 |
| JP | 2002-073619 | 3/2002 |
| JP | 2002-156873 | 5/2002 |
| JP | 2002-232634 | 8/2002 |

(Continued)

*Primary Examiner* — William Bashore
*Assistant Examiner* — Henry Orr
(74) *Attorney, Agent, or Firm* — Dickstein Shapiro LLP

(57) ABSTRACT

A technology for displaying managed image information is disclosed. A schedule information item is acquired, a document is acquired as an image information item in an electronic format, the image information item and the schedule information item are registered in a data storing unit in association with each other, the schedule information item and the image information item stored in the data storing unit are acquired, and the image information item is displayed according to the schedule information item.

20 Claims, 38 Drawing Sheets

FOREIGN PATENT DOCUMENTS

| | | |
|---|---|---|
| JP | 2002-245075 | 8/2002 |
| JP | 2002-278875 | 9/2002 |
| JP | 2002-342329 | 11/2002 |
| JP | 2002-373233 | 12/2002 |
| JP | 2003-517642 | 5/2003 |
| JP | 2003-303157 | 10/2003 |
| JP | 2003-330697 | 11/2003 |
| JP | 2004-078678 | 3/2004 |
| JP | 2004-094183 | 3/2004 |
| JP | 2004-110734 | 4/2004 |
| JP | 2004-110736 | 4/2004 |
| JP | 2004-133923 | 4/2004 |
| JP | 2004-272812 | 9/2004 |
| JP | 2004-303205 | 10/2004 |
| JP | 2005-092540 | 4/2005 |
| JP | 2005-160118 | 6/2005 |
| JP | 2005-196790 | 7/2005 |
| JP | 2005-202975 | 7/2005 |
| JP | 2005-216315 | 8/2005 |
| JP | 2005-228086 | 8/2005 |
| JP | 2005-242407 | 9/2005 |
| JP | 2006-011864 | 1/2006 |
| JP | 2006-190214 | 7/2006 |

* cited by examiner

FIG.10

| USER | REGISTRATION DATE | SCHEDULE | TITLE |
|---|---|---|---|
| A | 2003.2.3 13:45:34 | 2003.2.5 13:00–17:00 | A MEETING |
| A | 2003.2.24 19:34:23 | 2003.3.2–3.8 | INTERNATIONAL TECHNOLOGY WORKSHOP |
| B | 2003.11.22 9:23:34 | 2003.12.23–24 | ACADEMIC CONFERENCE |
| C | 2003.2.1 11:45:23 | 2003.03.21 15:00–17:00 | XYZ EXHIBITION |
| B D E | 2003.3.4 15:06:34 | 2003.3.8 9:00–12:00 | B MEETING |
| D | 2003.3.5 18:00:00 | 2003.4.12–13 | PLANNING MEETING CAMP |
| ... | ... | ... | ... |

FIG.12

| ID | REGISTRATION DATE | ISSUE DATE | DISPLAY LIMIT | TITLE | SCHEDULE | FILE | x | y | w | h | θ | URL |
|---|---|---|---|---|---|---|---|---|---|---|---|---|
| 1 | 2003.10.14 17:00:00 | — | 2003.12.18 17:00:00 | FLIER 1 | — | 20031014170000_1.jpg | 0 | 10 | 50 | 80 | 0 | http://www.server1/file/20031014170000_1.jpg |
| 2 | 2003.10.14 17:00:01 | — | 2003.12.18 17:00:00 | FLIER 1 | — | 20031014170000_2.jpg | 200 | 100 | 50 | 80 | 0 | http://www.server1/file/20031014170000_2.jpg |
| 3 | 2003.10.14 17:00:02 | — | 2003.12.18 17:00:00 | FLIER 1 | — | 20031014170000_3.jpg | 100 | 100 | 50 | 80 | 0 | http://www.server1/file/20031014170000_3.jpg |
| 4 | 2003.03.17 09:03:57 | 2003.12.03 15:00:00 | 2003.12.25 17:00:00 | INVITATION TO ABC ACADEMIC CONFERENCE | 2003.12.23-24 ACADEMIC CONFERENCE | 20030317090357_1.jpg | 20 | 200 | 70 | 90 | 0 | http://www.server1/file/20030317090357_1.jpg |
| 5 | 2003.03.19 12:13:23 | 2003.03.20 18:00:00 | | INVITATION TO EXHIBITION | 2003.03.21 15:00-17:00 XYZ EXHIBITION | 20030319121323_1.jpg | 400 | 50 | 100 | 70 | 90 | http://www.server1/file/20030319121323_1.jpg |
| 6 | 2003.03.23 18:34:21 | — | — | REPORT ON QUESTIONNAIRE RESULTS | — | 20030323183421_1.jpg | 500 | 250 | 80 | 90 | 0 | http://www.server1/file/20030323183421_1.jpg |

INFORMATION DISPLAY SYSTEM, APPARATUS AND METHOD OF DISPLAYING ELECTRONIC INFORMATION ACCORDING TO SCHEDULE INFORMATION

BACKGROUND OF THE INVENTION

1. Field of the Invention

The present invention relates to an information display system, an information display apparatus, an information display method, and a technology for facilitating operations to display electronic information.

2. Description of the Related Art

In recent years and continuing, relatively large liquid crystal display screens, plasma display screens, and electronic billboards that display information by scrolling characters, are installed in various public areas such as train stations, in front of train stations, convenience stores, hallways in buildings, coffee shops, etc.

The information displayed on the display devices can be shared by people in public areas. For example, information such as a newsflash can be displayed on an electronic billboard, and immediately provided to a passerby.

However, in order to post electronic information on an electronic billboard, it is necessary to register (enter) the information with a terminal dedicated to the electronic billboard, which entails extremely troublesome operations.

For example, Patent Document 1 discloses the following technology. A document capturing device reads image data of a document, inputs appended information such as the title of the document, requests a document storing server to store the document via a communication line, and sends the image data with the appended information. When a request to store the document is received from the document capturing device, the document storing server acquires the image data and appended data, and stores the image data so as to be associated with search information including the appended data. When a request to refer to the document is received from a reference PC via the communication line, the document storing server searches the image data based on the search information. When the image data are found as a result of the searching process, the document storing server sends the document of the image data to the reference PC, so that the document is displayed. Accordingly, a document can be easily displayed to the public via a communication network.

Patent Document 2 discloses the following technology. An image processing apparatus such as a copier is used to read information to be displayed from paper, and store the information in a storage unit. When the copier is not being used, the information is displayed in an electronic format. Accordingly, image processing apparatuses such as copiers installed in convenience stores can be easily used for electronically displaying a personal advertisement or community-oriented information.

Patent Documents 1: Japanese Laid-Open Patent Application No. 2002-73619

Patent Documents 2: Japanese Laid-Open Patent Application No. 2002-156873

The technology disclosed in these patent documents can somewhat facilitate operations for displaying electronic information. However, the user needs to input all appended information each time in order to display the information. Specifically, the title character string, the display date, the display limit, etc. of the information need to be input each time. Therefore, it is extremely troublesome to display electronic information.

Further, in the conventional technology, it is not possible to effectively edit or change the display format of the information once the information is sent to an electronic billboard. The information is just repeatedly displayed.

Moreover, when a display limit has passed, the corresponding information needs to be manually deleted by the user; therefore, it is difficult to manage the information.

SUMMARY OF THE INVENTION

Accordingly, the present invention may provide an information display system, an information display apparatus, and an information display method in which the above-described disadvantage is eliminated.

A preferred embodiment of the present invention provides an information display system, an information display apparatus, and an information display method that can facilitate operations for displaying electronic information, make it possible to register information by a one-touch operation, and enhance capabilities in managing and handling electronic information being displayed.

An embodiment of the present invention provides an information display system including an information issue device configured to acquire an image information item to be displayed; an information management device configured to manage the image information item to be displayed; and an information display device configured to display the image information item; wherein the information issue device, the information management device, and the information display device are interconnected by a network, and the information issue device includes a schedule acquiring unit configured to acquire a user-requested schedule information item; an image acquiring unit configured to acquire a document as the image information item in an electronic format; and a data registration requesting unit configured to send the schedule information item and the image information item to the information management device so as to be registered and managed; wherein the information management device includes a data registering unit configured to register the image information item and the schedule information item received from the data registration requesting unit in a data storing unit in association with each other, and the information display device includes an information displaying unit configured to acquire the schedule information item and the image information item stored in the data storing unit and display the image information item according to the schedule information item.

An embodiment of the present invention provides an information display method for displaying image information being managed, the method including the steps of (a) acquiring a user-requested schedule information item; (b) acquiring a document as an image information item in an electronic format; (c) registering the image information item and the schedule information item in a data storing unit in association with each other; and (d) acquiring the schedule information item and the image information item stored in the data storing unit, and displaying the image information item according to the schedule information item.

An embodiment of the present invention provides An information display apparatus for displaying image information being managed, the apparatus including a schedule acquiring unit configured to acquire a user-requested schedule information item; an image acquiring unit configured to acquire a document as an image information item in an electronic format; a data registering unit configured to register the image information item and the schedule information item in a data storing unit in association with each other; and an information displaying unit configured to acquire the schedule information item and the image information item stored in the data storing unit, and display the image information item according to the schedule information item.

According to one embodiment of the present invention, operations for displaying electronic information are facilitated, and capabilities in managing and handling displayed electronic information are enhanced.

BRIEF DESCRIPTION OF THE DRAWINGS

Other objects, features and advantages of the present invention will become more apparent from the following detailed description when read in conjunction with the accompanying drawings, in which:

FIG. 10 is an example table of data stored in a schedule storing unit;

FIG. 12 an example table of data stored in the schedule storing unit;

DETAILED DESCRIPTION OF THE PREFERRED EMBODIMENTS

A description is given, with reference to the accompanying drawings, of an embodiment of the present invention.

First Embodiment

Figure 1:
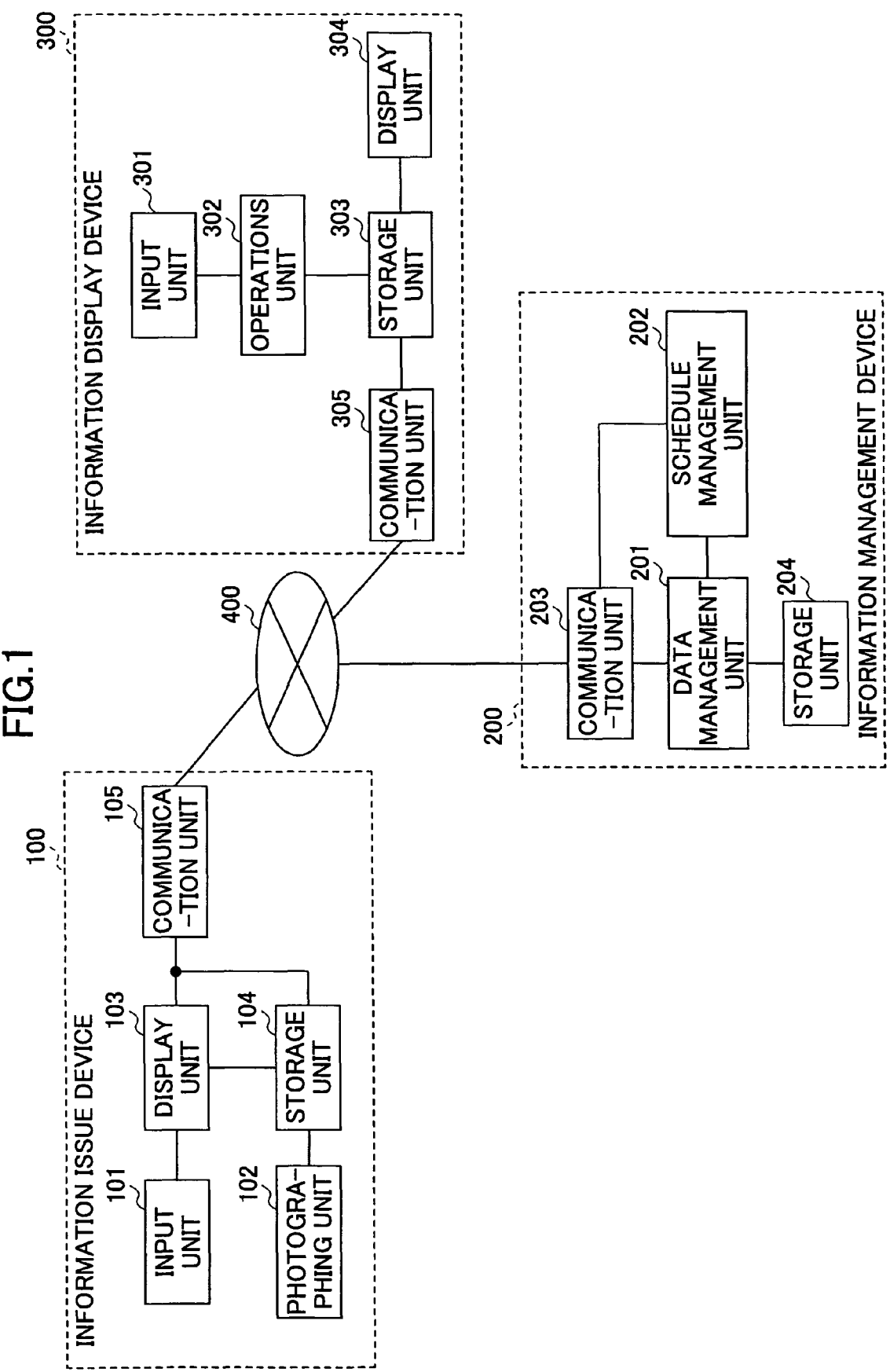
FIG. 1 is a block diagram of an information display system according a first embodiment of the present invention.

FIG. 1 is a block diagram of an information display system according a first embodiment of the present invention. The information display system includes an information issue device 100, an information management device 200, and an information display device 300. Each device includes one or more equipment units, which are interconnected via a network 400.

The information issue device 100 includes: an input unit 101 including a pointing device such as a touch panel or a mouse; a photographing unit 102 that photographs images and videos and retrieves them as electronic image information; a display unit 103 that displays input data, instructions, or guides; a storage unit 104 that holds input image information or instructions; and a communication unit 105 that transmits/receives information of the storage unit 104 and the display unit 103 via the network 400.

Figure 2A:
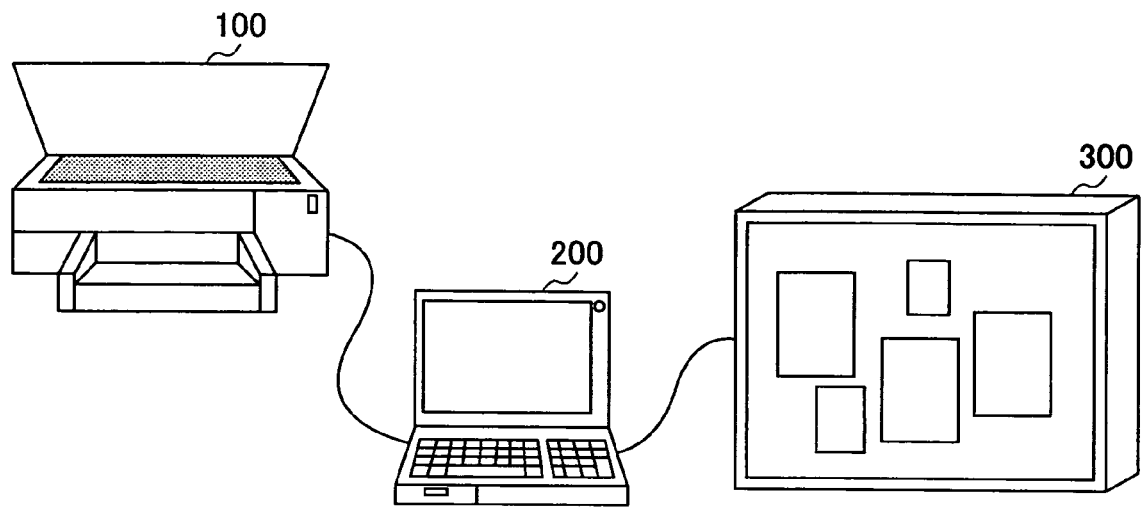
FIGS. 2A, 2B are outside drawings of the information display system according the first embodiment.
Figure 2B:
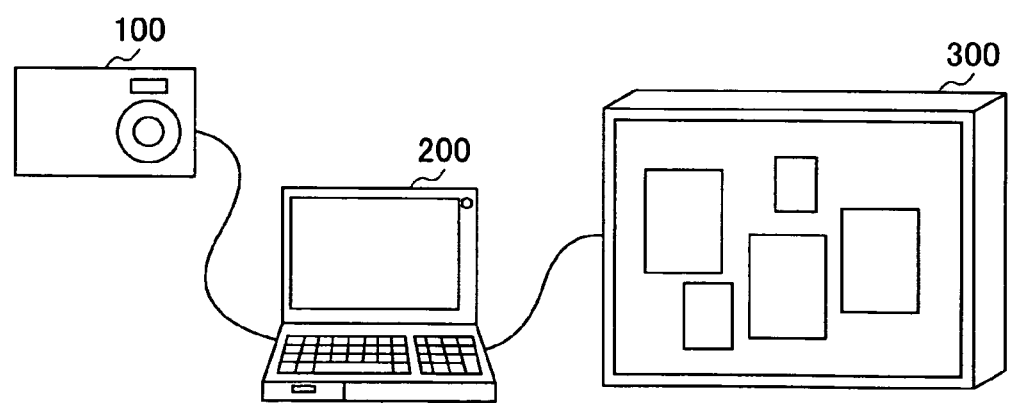

As shown in FIG. 2A, the information issue device 100 can be a general multifunction peripheral (MFP), a scanner, a copier, or a facsimile machine. As shown in FIG. 2B, the information issue device 100 can be a mobile terminal, for example, a mobile telephone having a photographing function such as a digital camera or a digital video camera.

The information management device 200 includes: a communication unit 203 that transmits/receives information to/from the information issue device 100 and the information display device 300 via the network 400; a data management unit 201 that records and manages information transmitted/ received by the communication unit 203; a schedule management unit 202 that manages users' schedule information in a database; and a storage unit 204 that stores information transmitted/received.

As shown in FIGS. 2A, 2B, the information management device 200 can be an information terminal such as a personal computer or a workstation.

The information display device 300 includes: a communication unit 305 that transmits/receives information to/from the information management device 200 via the network 400; a storage unit 303 that records information transmitted/received by the communication unit 305; an operations unit 302 that operates on and edits information recorded in the storage unit 303; an input unit 301 including a pointing device such as a touch panel or a mouse; and a display unit 304 that displays/edits image information and appended information recorded in the storage unit 303 in a bitmap format.

As shown in FIGS. 2A, 2B, the information display device 300 can be a plasma display device or a liquid crystal display device.

The network 400 is a transmission channel for integrating the information issue device 100, the information management device 200, and the information display device 300. The network 400 can be wired or wireless, as long as the communication protocols between the devices are consistent. The network 400 can be realized by a LAN (Local Area Network), a WAN (Wide Area Network), the Internet, etc.

Each of the devices operates as follows.

The information management device 200 manages schedule information including names of conferences/events and dates on which these are scheduled. The information issue device 100 acquires the schedule information, acquires electronic image information of information that a user desires to display/issue, and records the image information together with the schedule information and appended information such as issue information or a display limit, in the information management device 200. The information display device 300 reads the image information, the schedule information, and the appended information recorded in the information management device 200, and displays/edits the information.

Figure 3:
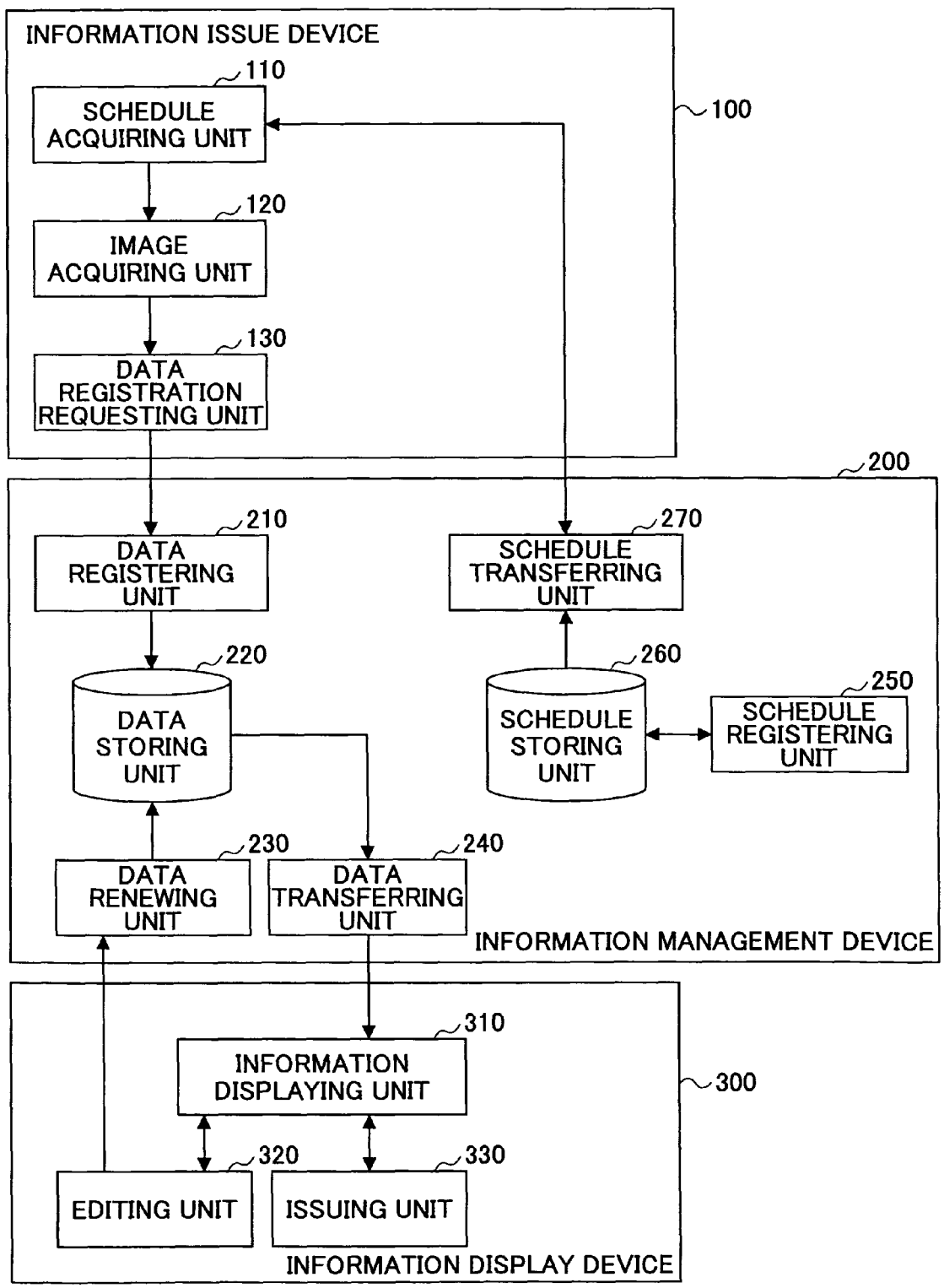
FIG. 3 is a functional block diagram of each of the devices in the information display system according to the first embodiment.

FIG. 3 is a functional block diagram of each of the devices in the information display system according to the first embodiment. The information issue device 100 includes a schedule acquiring unit 110, an image acquiring unit 120, and a data registration requesting unit 130.

In the information issue device 100, the schedule acquiring unit 110 is activated when a user presses an information issue button from a function menu at the input unit 101. The schedule acquiring unit 110 requests the information management device 200 to provide schedule information, and displays the acquired schedule information on the display unit 103.

Figure 4:
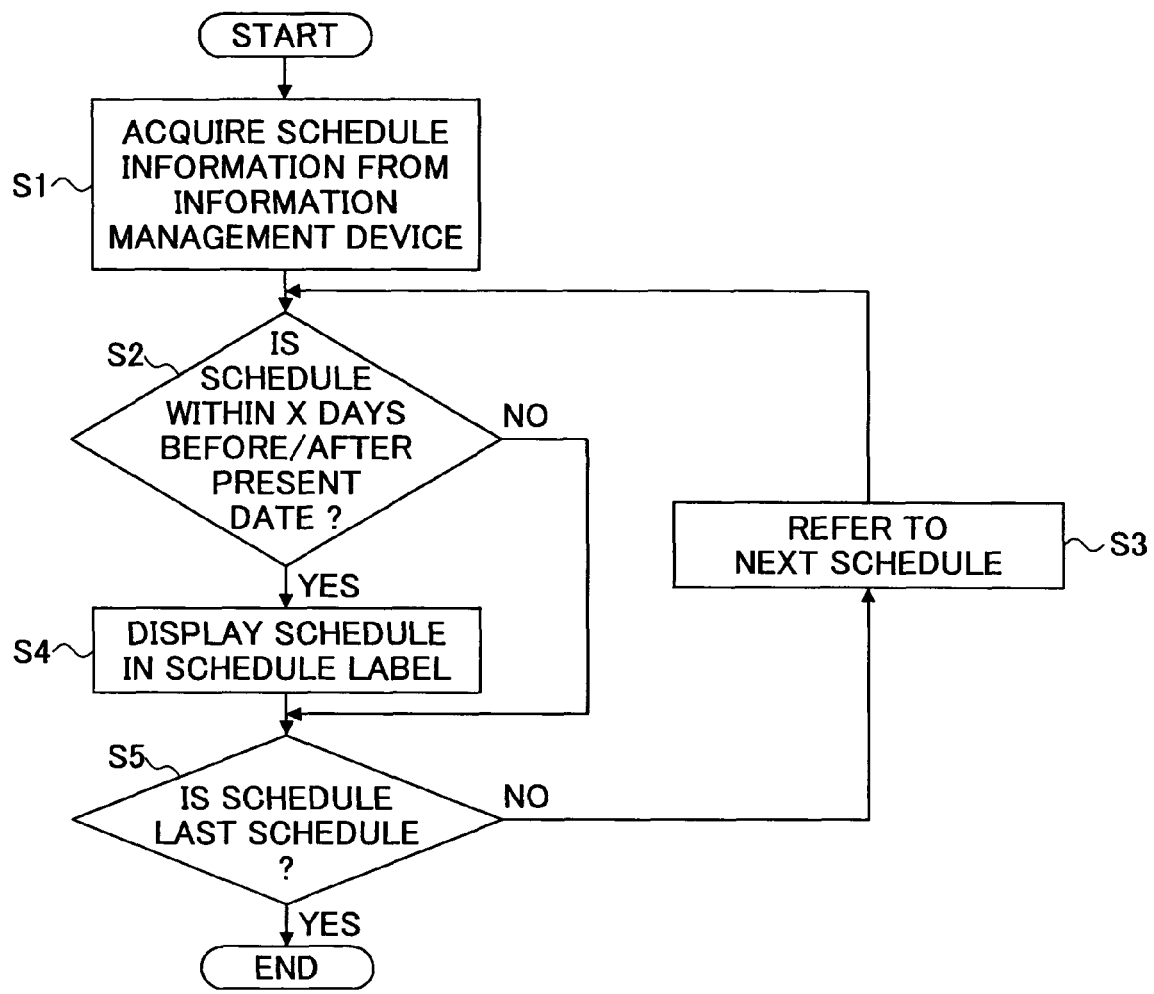
FIG. 4 is a flowchart of a process performed by a schedule acquiring unit.

A process performed by the schedule acquiring unit 110 is described with reference to a flowchart shown in FIG. 4.

The schedule acquiring unit 110 requests the information management device 200 to provide schedule information, and acquires schedule information such as the user who has registered the schedule information, the date of registration, the schedule contents, the title, etc. (step S1).

The schedule acquiring unit 110 determines whether the schedule of the acquired schedule information is within a predetermined number of days (X days) before/after the present date. When the schedule is not within X days before/after the present date (No in step S2), the process proceeds to step S5.

On the other hand, when the schedule is within X days before/after the present date (Yes in step S2), the schedule is sequentially displayed in schedule labels (step S4).

When the schedule is the last one (Yes in step S5), the process ends.

On the other hand, when the schedule is not the last one (No in step S5), the schedule acquiring unit 110 refers to the next schedule (step S3), and the process returns to step S2.

The above-mentioned number of days (X days) corresponds to a predetermined period of displaying schedule information. For example, if the number of days is 30 days, schedules of approximately one month before/after the present date can be obtained.

Alternatively, the information management device 200 can extract schedule information of X days before/after the present date, and send back the extracted schedule information to the information issue device 100.

Figure 5:
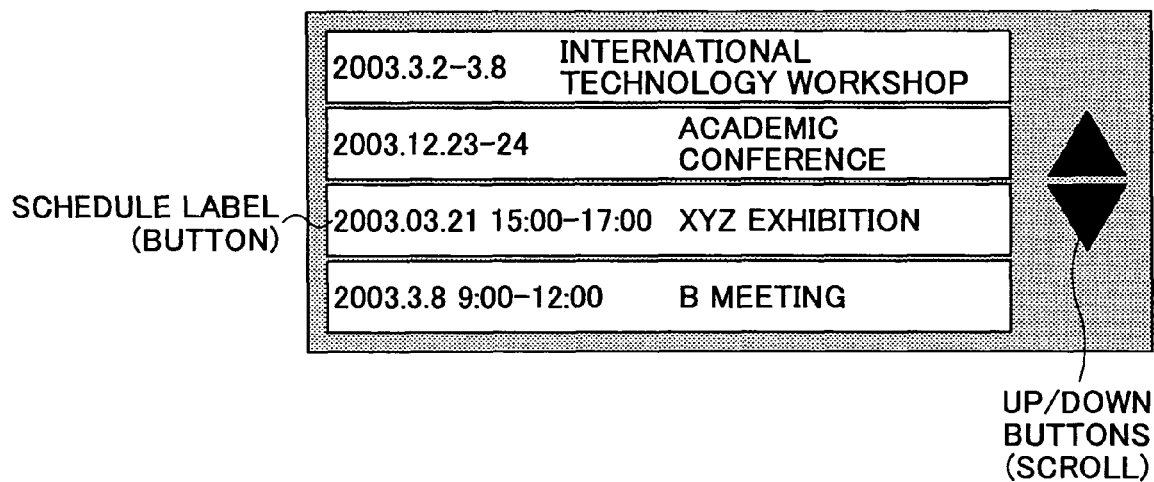
FIG. 5 is an example list of schedule labels displayed at the schedule acquiring unit.

According to the above operations, the schedule acquiring unit 110 displays a schedule label list as shown in an example of FIG. 5. The list shown in FIG. 5 is used for associating information that a user desires to display and the corresponding schedule information (schedule and title). The list includes schedule labels (buttons) for executing image acquiring operations and up/down buttons for scrolling up and down to display past and future schedules.

By selecting/pressing a schedule button at the input unit 101, the image acquiring unit 120 is activated and associated with the schedule information of the pressed schedule label, to perform the image acquiring operation.

When there are more schedule information items than the number of schedule labels that can be displayed, the up/down buttons are used for scrolling through the list to display hidden schedule labels. By pressing the up button (▲), the schedule labels are scrolled downward, so that schedule labels corresponding to past schedules can be displayed.

Conversely, by pressing the down button (▼), the schedule labels are scrolled upward, so that schedule labels registered for future dates can be displayed.

The image acquiring unit 120 is activated by pressing any one of the schedule labels. The image acquiring unit 120 uses parameters set in the storage unit 104 to acquire image data from the photographing unit 102, and temporarily stores the acquired image data in the storage unit 104.

Figure 6:
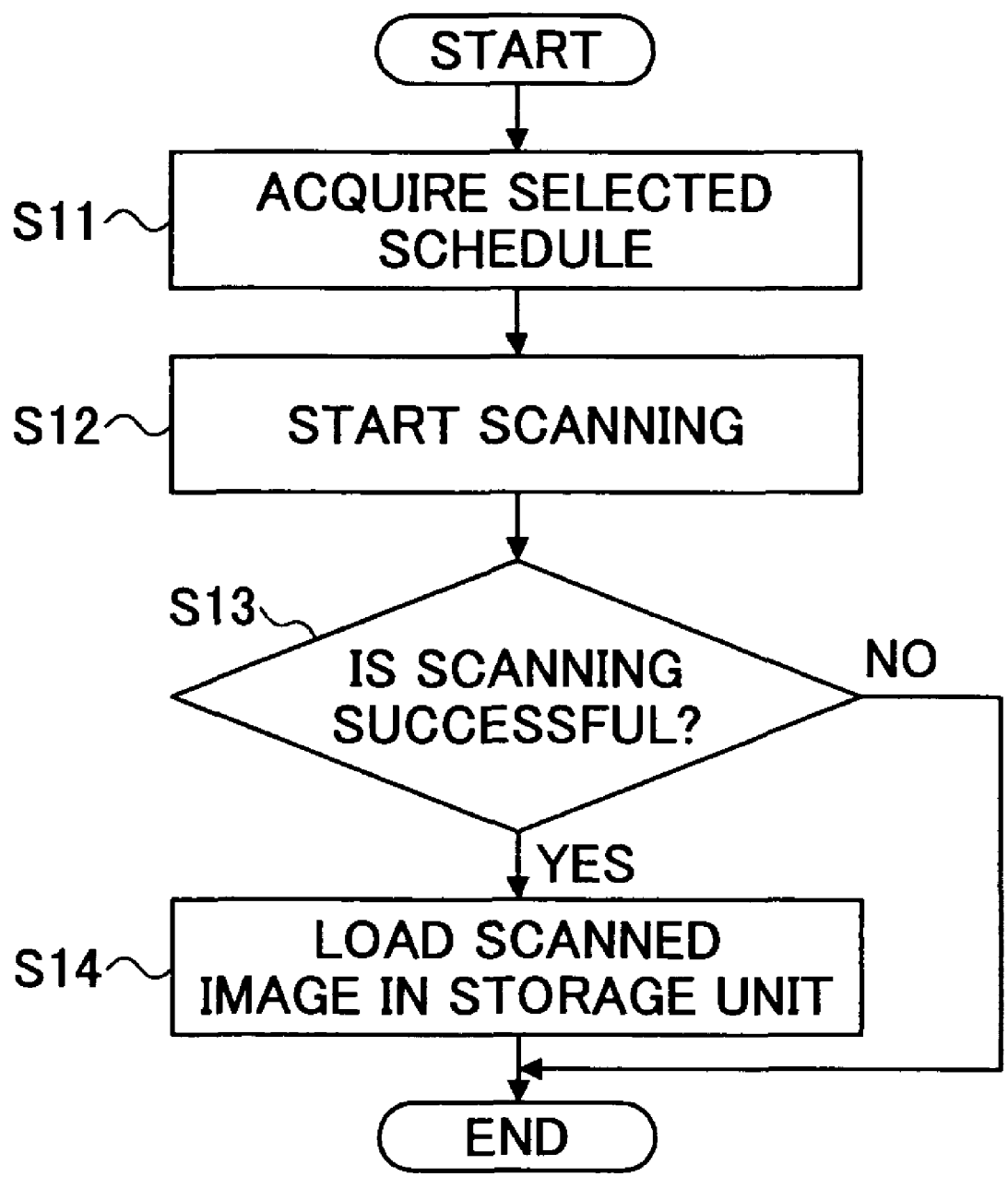
FIG. 6 is a flowchart of a process performed by an image acquiring unit.

A process performed by the image acquiring unit 120 is described with reference to a flowchart shown in FIG. 6.

The image acquiring unit 120 acquires schedule information corresponding to a selected schedule label button (step S11), and starts scanning an image by using the parameters set in the storage unit 104 (step S12).

When the scanning operation is successfully completed (Yes in step S13), the scanned image information is loaded in the storage unit 104 (step S14). When the scanning operation is unsuccessful (No in step S13), the process ends, and the image acquiring unit 120 waits for the user to select the next schedule label.

In the above description, the image acquiring unit 120 acquires an image with a scanner; however, the image acquiring unit 120 can acquire an image photographed with a digital camera or a video camera, or acquire an image from another computer or a mobile terminal connected to the network 400.

The data registration requesting unit 130 sends the image data temporarily stored in the storage unit 104 and the corresponding schedule information to the information management device 200 via the communication unit 105, as a data registration request.

The information management device 200 includes a data registering unit 210, a data storing unit 220, a data updating unit 230, a data transferring unit 240, a schedule registering unit 250, a schedule storing unit 260, and a schedule transferring unit 270.

The data management unit 201 includes the data registering unit 210, the data updating unit 230, and the data transferring unit 240. The data storing unit 220 stores data in the storage unit 204.

The schedule management unit 202 includes the schedule registering unit 250 and the schedule transferring unit 270. The schedule storing unit 260 stores schedules in the storage unit 204.

Data of the schedule information to be registered can be temporarily stored in the schedule storing unit 260 before being registered. The schedule information can be edited in an information terminal such as a user's personal computer or workstation, in the information issue device 100, or in the information display device 300. Besides using the interfaces described above, it is also possible to import schedule information that has been registered by using other software such as groupware.

It is possible to import schedule information that has been registered during regular business circumstances by using other software. Therefore, even complicated information can be registered and edited in a completely trouble-free manner, in the process of displaying information with the present invention.

To register schedule information with the information management device 200, a user activates the schedule registering unit 250 by selecting it from a menu, etc.

Figure 7:
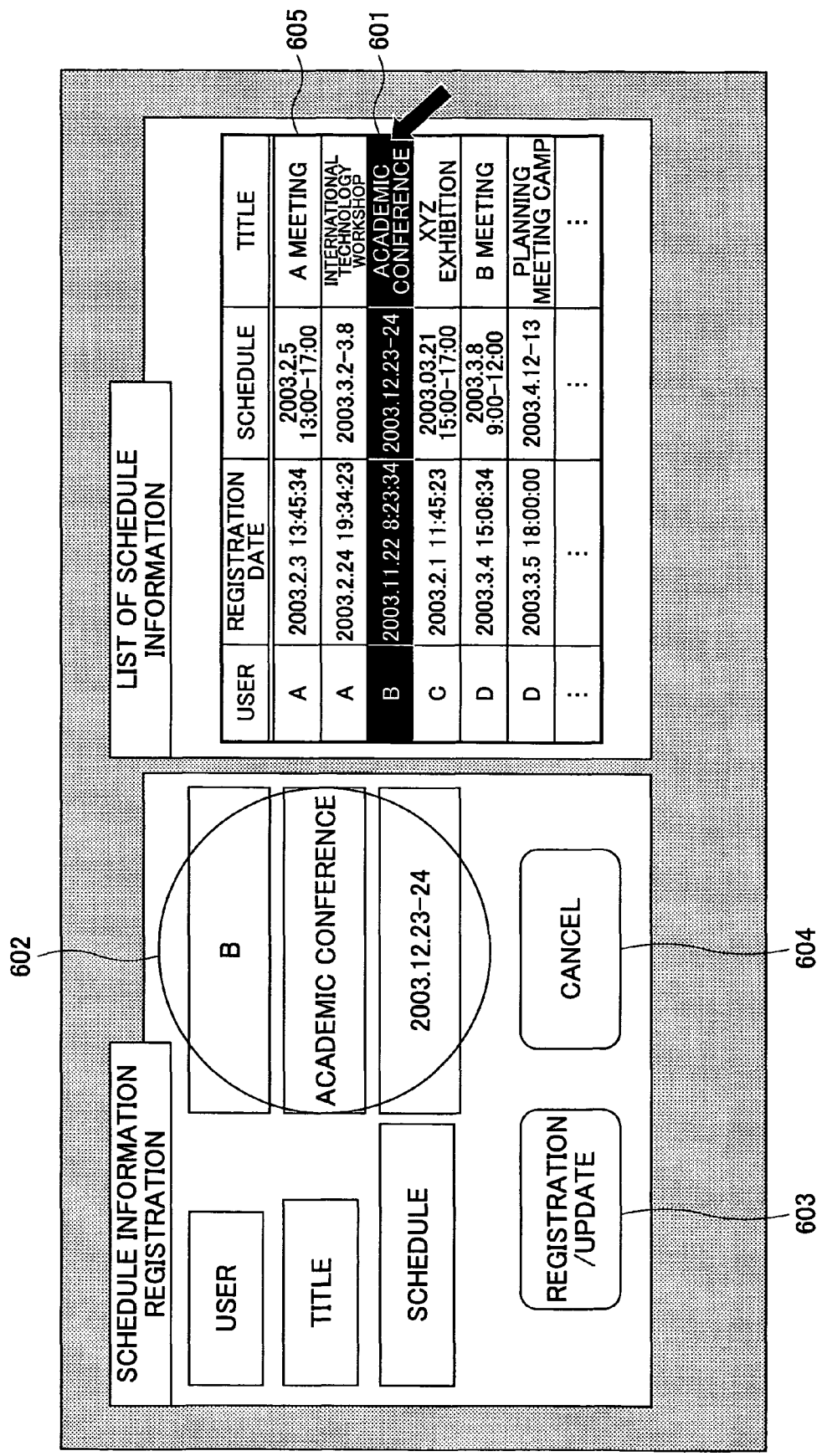
FIG. 7 is an example registration screen for registering schedule information.

When the schedule registering unit 250 is activated, a registration screen for registering schedule information is displayed, as shown in an example in FIG. 7.

As shown on the left as viewed in FIG. 7, the registration screen for registering schedule information includes input fields to input information such as the user, the title, and the schedule; a registration/update button 603 for registering or updating input information; and a cancel button 604 for cancelling the input information. As shown on the right as viewed in FIG. 7, the registration screen also includes a list 605 of schedule information items presently registered in the schedule storing unit 260.

Figure 8:
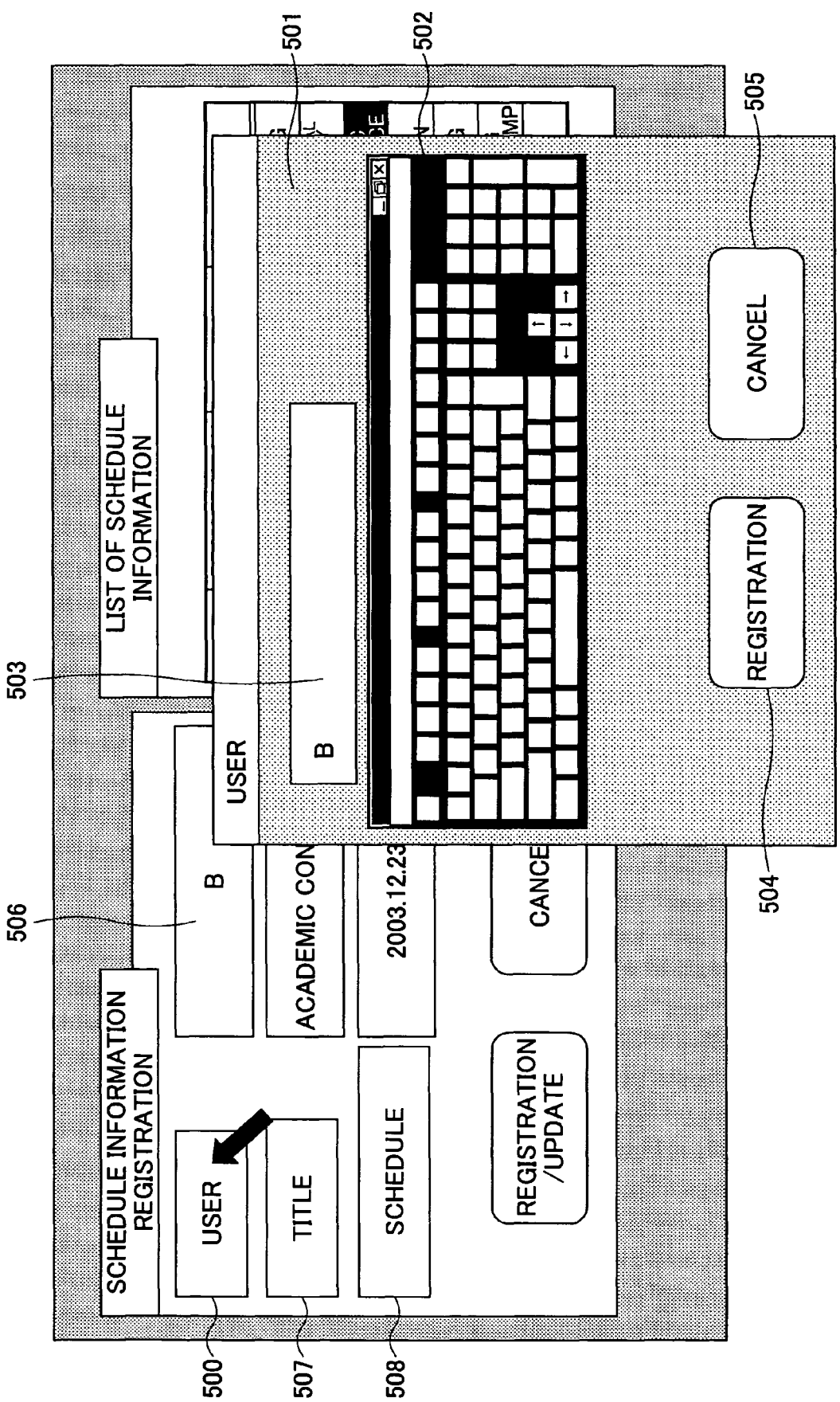
FIG. 8 is an example of information input to the schedule information.

Referring to FIG. 8, to register new schedule information in the registration screen, a user presses any one of a user button 500, a title button 507, or a schedule button 508 according to the information to be registered (edited). Accordingly, a corresponding window 501 including a screen keyboard 502 pops up.

By typing keys of the screen keyboard 502 in the window 501, characters are input in a text box 503 above the screen keyboard 502. Then, when a registration button 504 is pressed, the information input in the text box 503 is input in a text box 506 corresponding to the user button 500 in a "schedule information registration" area.

When a cancel button 505 is pressed, nothing is input in the text box 506 corresponding to the user button 500.

Information corresponding to the title button 507 or the schedule button 508 can be input in the schedule information registration area by the same operation as above.

The schedule information already registered in the screen of FIG. 7 is updated as follows. For example, a user presses schedule information 601, which is one of the schedule items in a "list of schedule information" area. Accordingly, corresponding information is displayed in items 602 in the "schedule information registration" area on the left. This information, which is already registered, can be edited in the same manner as registering the items as described above.

Finally, when the user presses the registration/update button 603 at the input unit 101, the schedule information including the respective items is registered or updated in the schedule storing unit 260. When the registration or the updating is completed, the registered or updated schedule information is displayed in the "list of schedule information" area on the right.

Figure 9:
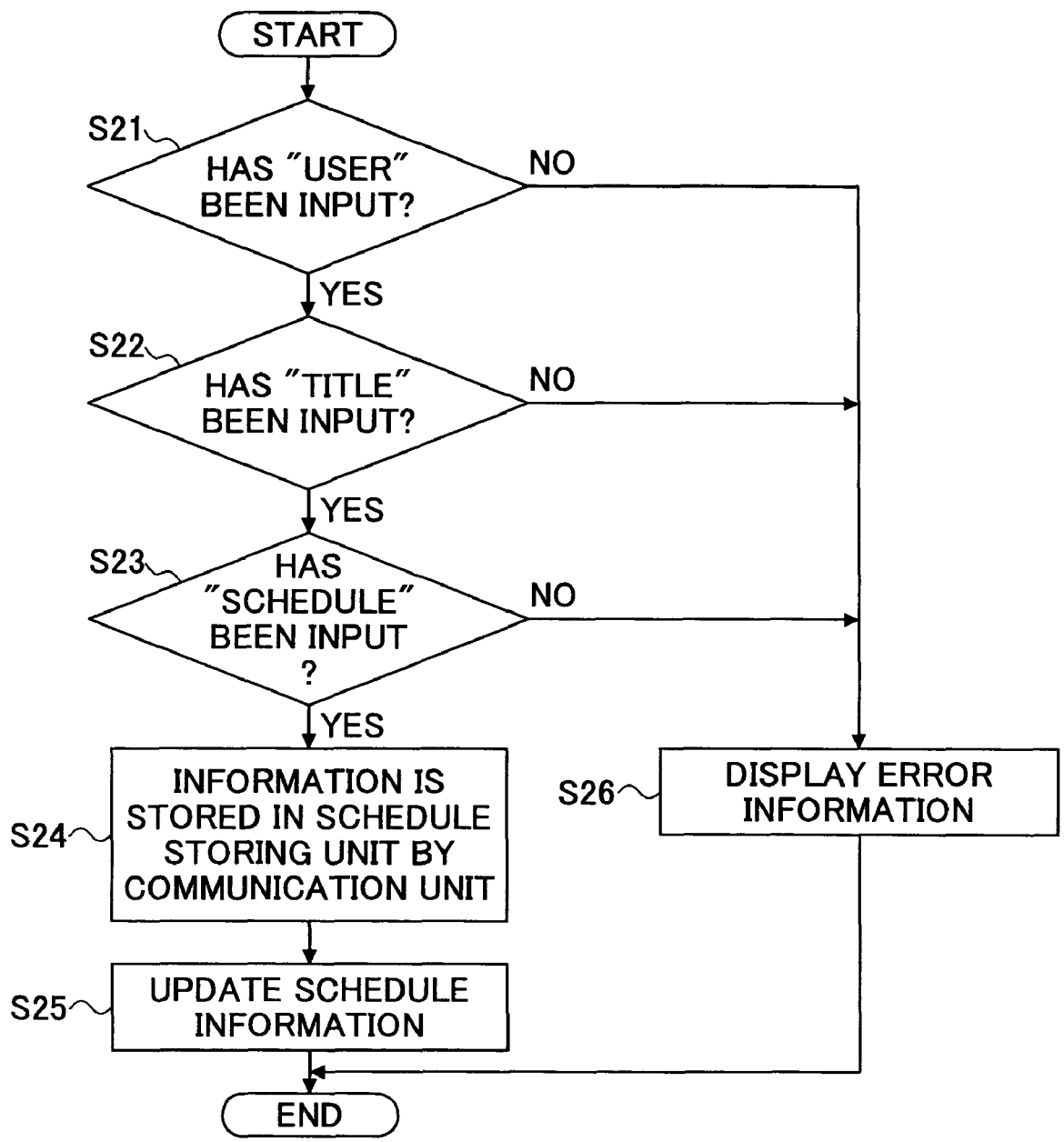
FIG. 9 is a flowchart of a process performed when a user presses the registration/update button at a schedule registering unit.

A process performed by the information management device 200 when a user presses the registration/update button 603 is described with reference to a flowchart shown in FIG. 9.

Steps S21 through S23 are sequentially performed. Specifically, it is determined whether a value for "user" has been input (step S21), whether a value for "title" has been input (step S22), and whether a value for "schedule" has been input (step S23).

When a value has not been input in any one of these fields (No in step S21, No in step S22, or No in step S23), error information is displayed (for example, a dialog such as "information is not input") (step S26), and the process ends.

When a value has been input in all of these fields, (Yes in step S23), information input in the schedule storing unit 260 is registered or updated (step S24), the "list of schedule information" area shown on the right side in FIG. 7 is updated, and the process ends (step 25).

As shown in an example table of FIG. 10, information of at least the user, the registration date, the schedule, and the title is stored for each schedule information item in the schedule storing unit 260.

In the table of FIG. 10, the "user" field can store personal identification information, a name, or nickname unique to each user. The user field can store information about a single user or plural users. Personal identification information can be values such as 0001, 0002, 0003..., e-mail addresses such as user1@domain.com, user2@domain.com..., or character strings such as A, B, C....

When there are plural users, user information can be separated by spaces, so that each character string is distinguishable.

The "registration date" field stores the date on which the schedule information is registered or updated. The registration date is expressed such that the year, month, and date are separated by ". (period)", and the time, minute, and second are separated by ": (colon)".

The same applies to the "schedule" field, although seconds can be omitted, or a "- (hyphen)" can be used instead of a period.

The "title" field includes contents expressed by character strings in a free format.

When a request to acquire schedule information is received from the information issue device 100, the schedule transferring unit 270 extracts all schedule information items stored in the schedule storing unit 260, and sends the extracted schedule information to the information issue device 100. Alternatively, as described above, the schedule transferring unit 270 can extract schedule information corresponding to X days before/after the present date (X days being a predetermined schedule acquisition period set in the storage unit 204, for example, 30 days), and send only the extracted schedule information to the information issue device 100.

Figure 11:
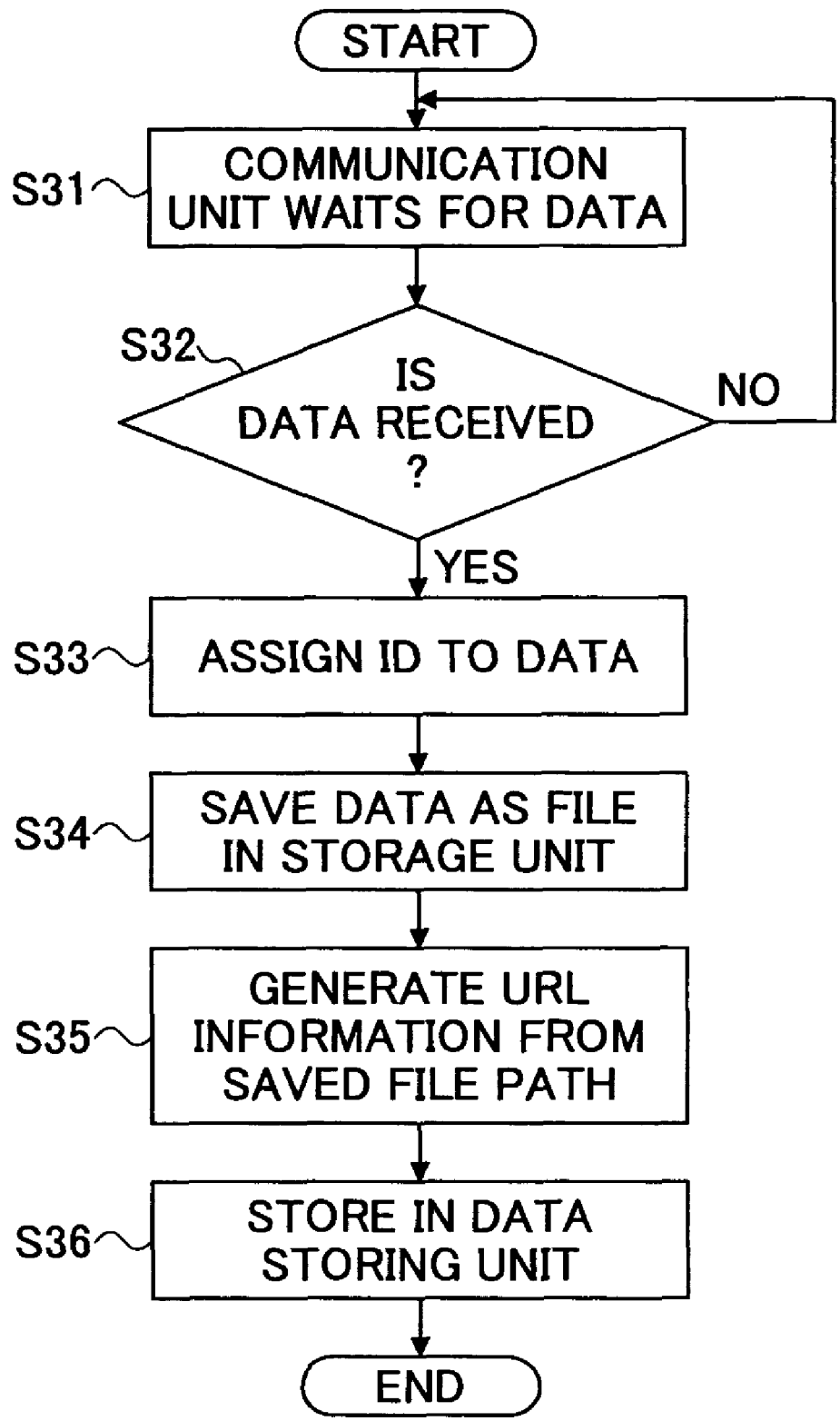
FIG. 11 is a flowchart of a process performed by a data registering unit.

The data registering unit 210 is activated when a data registration request is received from the data registration requesting unit 130 of the information issue device 100 via the communication unit 203. A process performed by the data registering unit 210 is described with reference to a flowchart shown in FIG. 11.

First, the communication unit 203 is in standby, waiting for data including image information and schedule information appended to the image information (step S31). When data are not received (No in step S31), the communication unit 203 continues waiting in standby.

When it is determined that data are received (Yes in step S32), the communication unit 203 assigns an ID value for identifying the data received (step S33). An ID value is assigned in the order of receiving data, such as 1, 2, 3, 4 . . . , so that there are no overlapping ID values.

Next, the image information received is saved in the storage unit 204 as a file in a standard image file format such as JPEG or BMP (step S34).

Next, URL (Uniform Resource Locator) information is generated from the file path of the file saved in the storage unit 204 (step S35).

For example, when the file path of the image information saved in the storage unit 204 is /data/file/20031014170000_1.jpg, and the address of the information display device 300 is www.server1, a URL such as http://www.server1/file/20031014170000_1.jpg is generated. This URL is generated by replacing the character string of /data with a character string of http://www.server1.

Finally, "ID", "registration date", "issue date", "display limit", "title", "schedule", "URL", and parameters "x", "y", "w", "h", "θ" are added, and the data are stored in the data storing unit 220 (step S36).

Specifically, "x, y" represents a display position (horizontal/vertical coordinates from top left corner) of the image information when being displayed in the information display device 300, and "w, h" represents a size (width and height) of the image information when being displayed in the information display device 300. Further, "θ" represents a rotational angle around the centroid of the image information.

As shown in an example table of FIG. 12, the data storing unit 220 stores "ID", "registration date", "issue date", "display limit", "title", "schedule", "x", "y", "w", "h", "θ", and "URL" for each data registration request received.

The data updating unit 230 receives, from an editing unit 320 of the information display device 300 via the communication unit 203, an ID of edited data, and edited values of "x", "y", "w", "h", "θ". The data updating unit 230 updates the values of "x", "y", "w", "h", "θ" of data corresponding to the ID stored in the data storing unit 220 to the received values.

When a data request is received from an information displaying unit 310 of the information display device 300 via the communication unit 203, the data transferring unit 240 acquires all data stored in the data storing unit 220, and sends the data to the information displaying unit 310.

The information display device 300 includes the information displaying unit 310, the editing unit 320, and the issuing unit 330.

Figure 13:
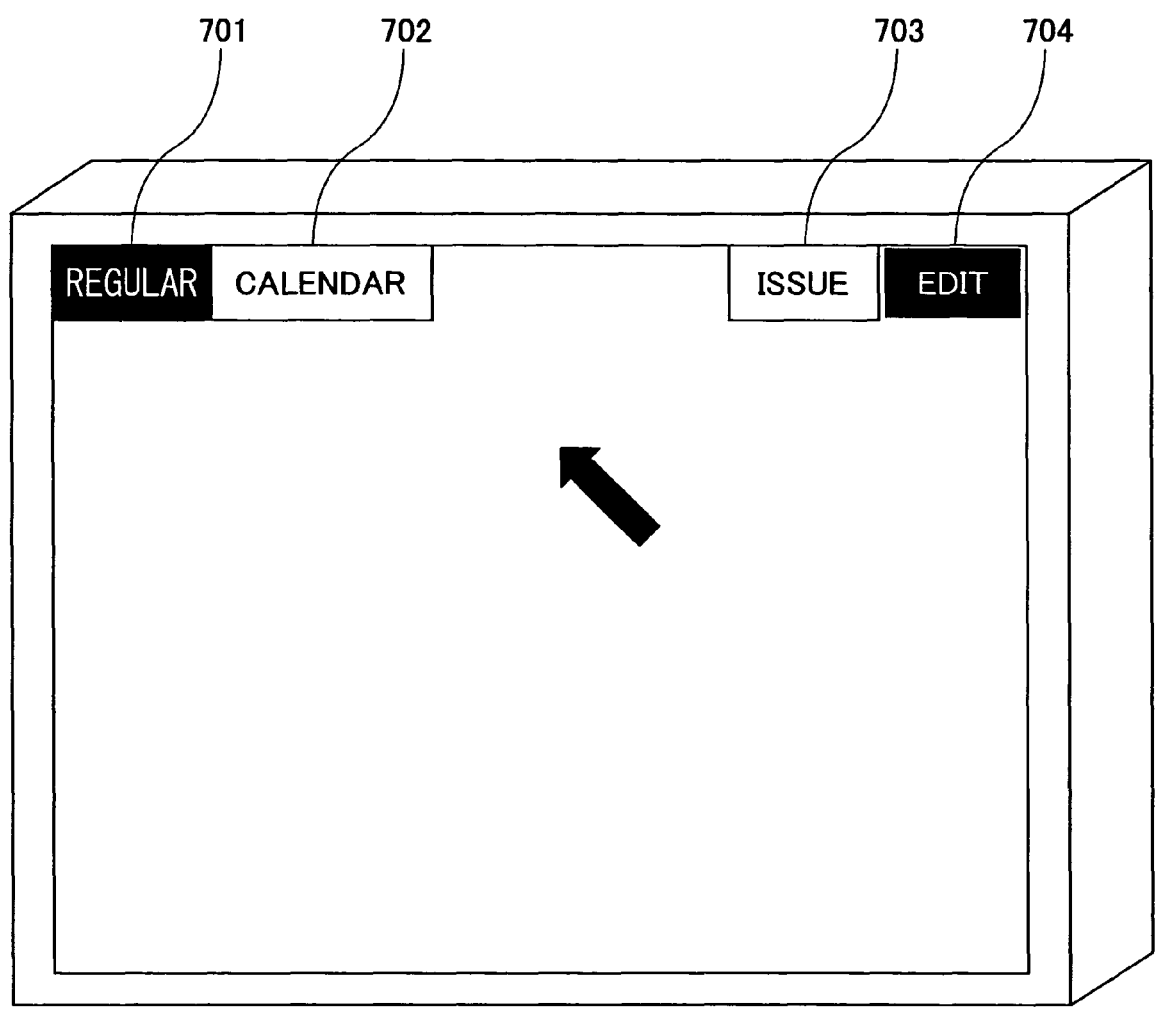
FIG. 13 is an example screen of an information display device.

As shown in FIG. 13, a display screen of the information display device 300 includes a "regular" button 701 and a "calendar" button 702 for selecting the display mode, and an "issue" button 703 and an "edit" button 704 for selecting an editing mode.

When the information display device 300 is operated by a general user, the "regular" button 701, the "calendar" button 702, and the "issue" button 703 are shown, but the "edit" button 704 is not shown. However, when the information display device 300 is operated by a system administrator, all four buttons are shown, so that the image information can be displayed and edited.

Further, when a general user operates the information display device 300, the user only needs to switch the display mode between "regular" and "calendar". Therefore, the "issue" button can be omitted. However, a zooming process cannot be performed when the "issue" button is not shown.

Figure 14:
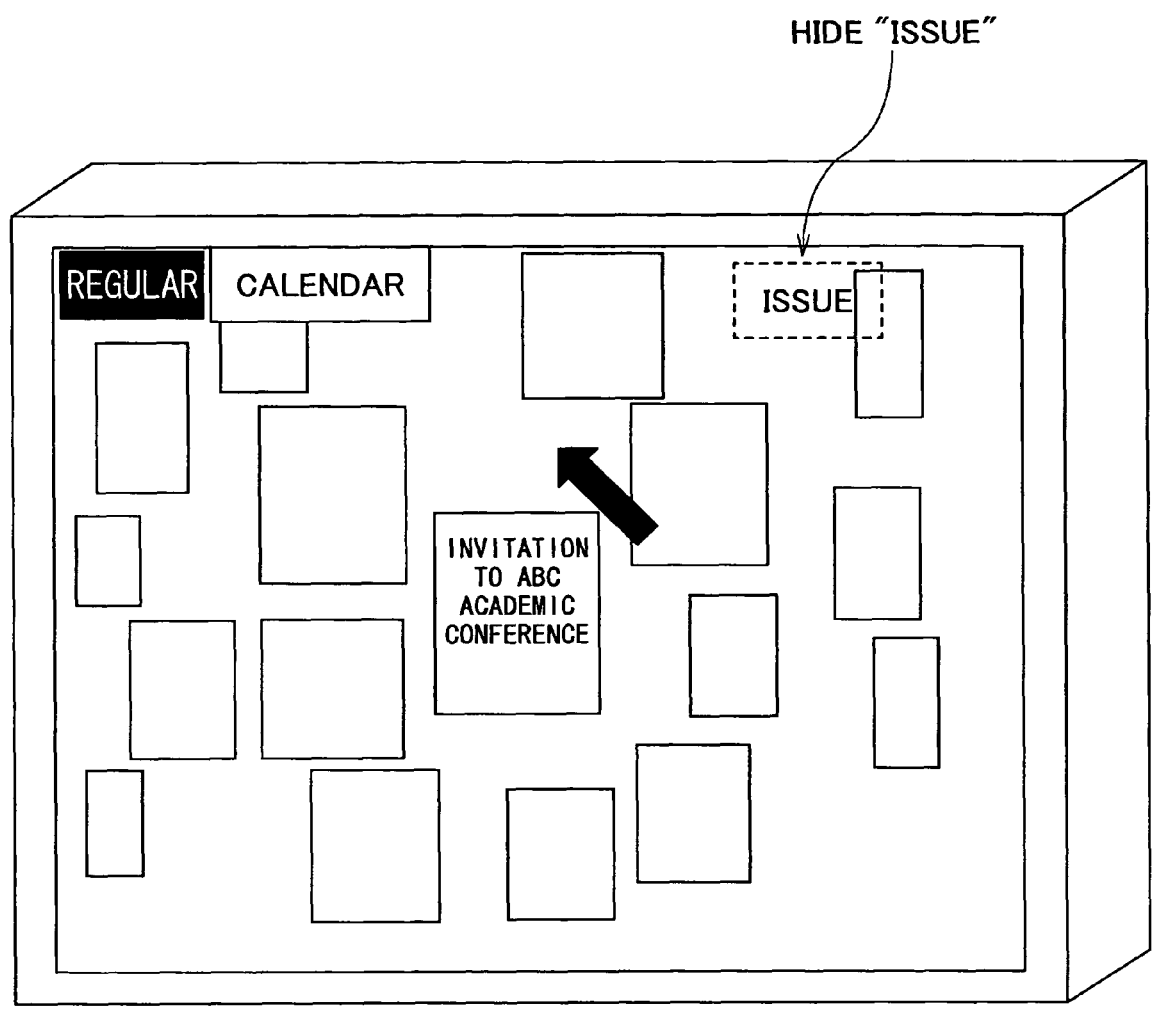
FIG. 14 is an example screen of the information display device when an "issue" button is hidden.

A zooming process may be required if the user desires to enlarge the display to view the contents in detail. To address this requirement, as shown in FIG. 14, the "issue" button can be hidden under normal conditions, and provide a means for showing the "issue" button when required (for example, by pressing the area of the "issue" button for a long time).

When the "issue" button is shown, a zooming process can be performed for the displayed image.

Then, the "issue" button is hidden again by pressing the "issue" button, so that a zooming process is prevented from being performed.

Accordingly, by hiding the "issue" button, it is possible allow specific users to edit the image.

The following is a description of the information display device 300 used by a system administrator, which is also applicable to the information display device 300 used by a general user.

The information displaying unit 310 is activated when either the "regular" button 701 or the "calendar" button 702 is selected/pressed at the input unit 301.

Figure 15:
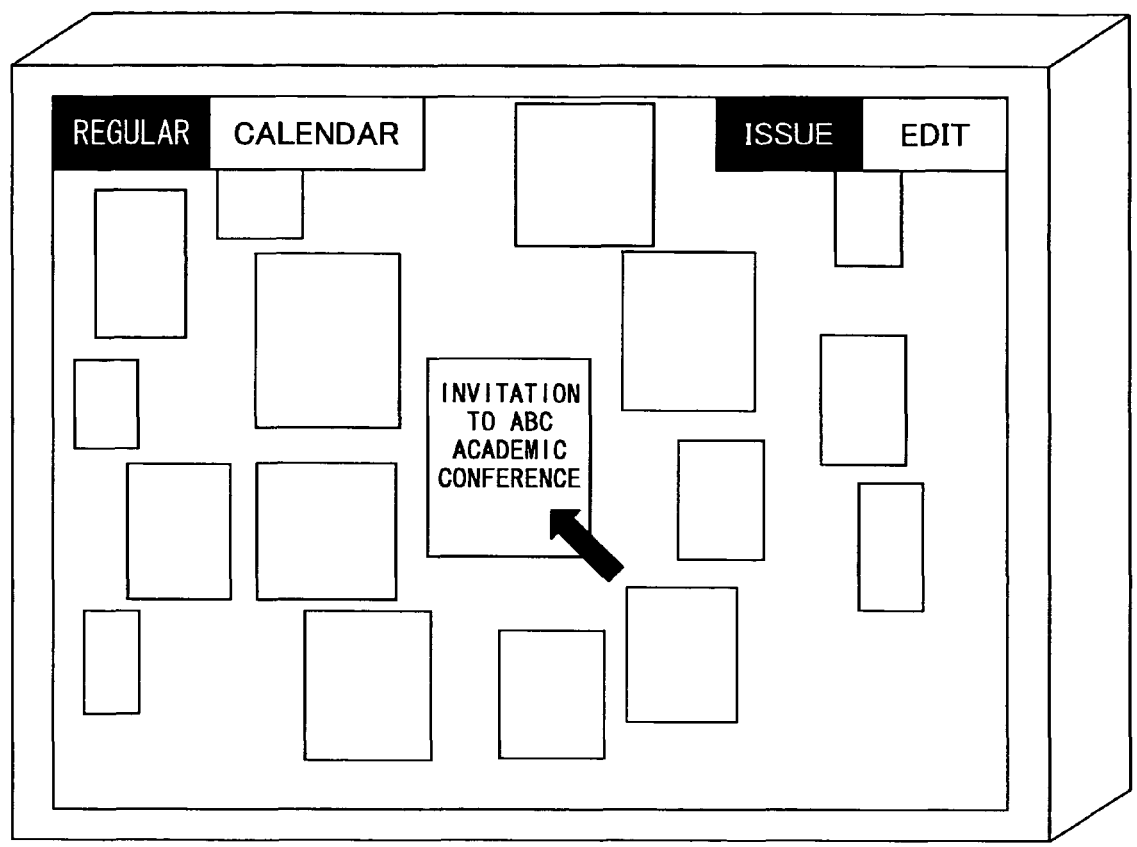
FIG. 15 is an example screen of the information display device when a "regular" button is pressed.
Figure 16:
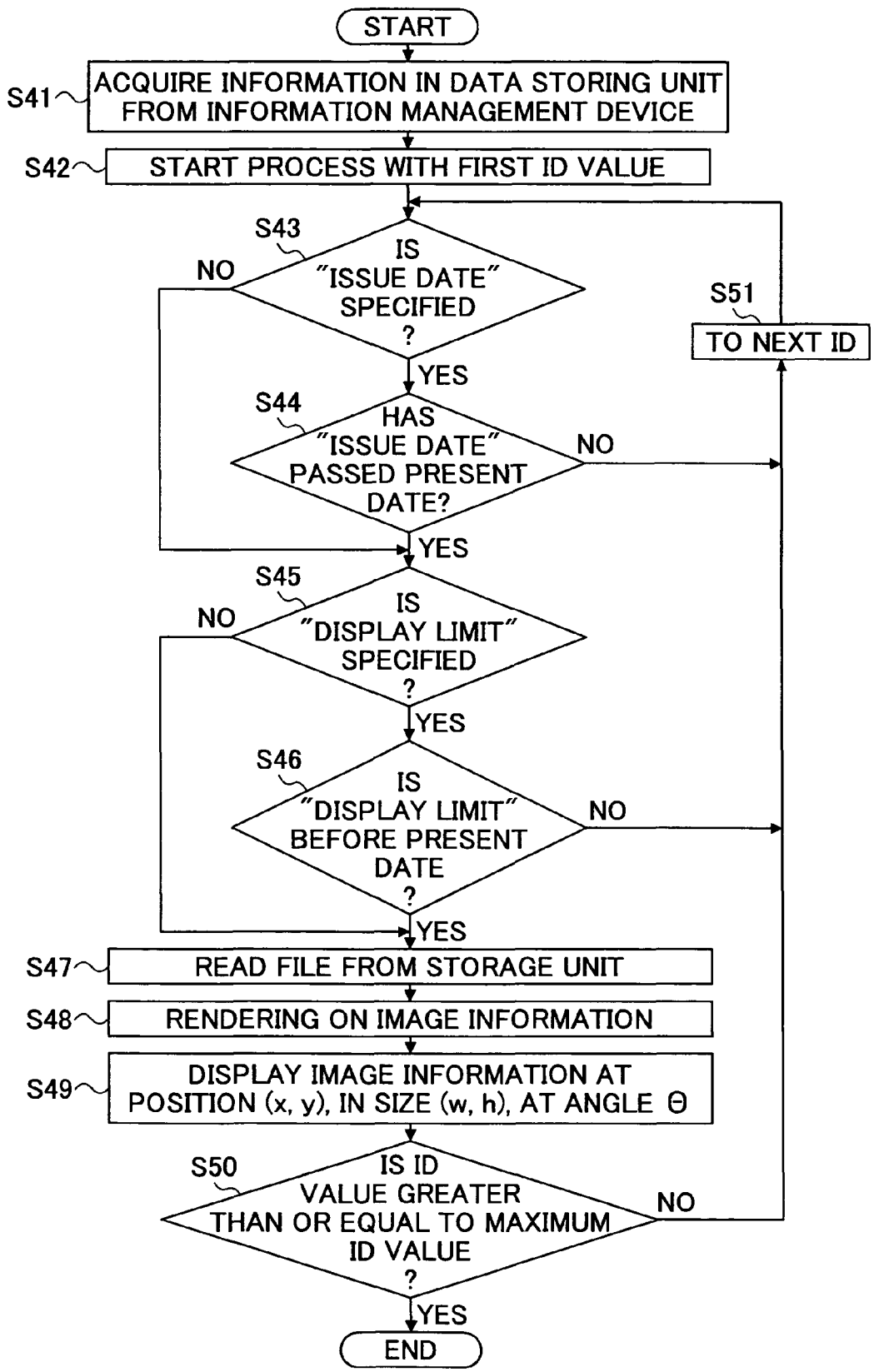
FIG. 16 is a flowchart of a process performed by an information display unit when the "regular" button is pressed.

When the "regular" button 701 is pressed, as shown in FIG. 15, registered data are displayed across the whole screen of the information displaying unit 310. A process performed by the information displaying unit 310 is described with reference to a flowchart shown in FIG. 16.

The information displaying unit 310 sends a request to the data transferring unit 240 of the information management device 200, via the communication unit 305 of the information display device 300, to transfer all data stored in the data storing unit 220. The information displaying unit 310 records the received data in the storage unit 303 (step S41).

Next, the information displaying unit 310 sequentially performs the process starting with data corresponding to the first ID value recorded in the storage unit 303 (step S42).

When the "issue date" of the ID is not specified (No in step S43), the process proceeds to step S45. On the other hand, when the "issue date" of the ID is specified (Yes in step S43), and the "issue date" has not passed the present date (No in step S44), the object of process changes to the next ID (step S51), and the process returns to step S43.

On the other hand, when the "issue date" has passed the present date (Yes in step S44), the process proceeds to step S45.

When the "display limit" is specified (Yes in step S45), and the "display limit" is not before the present date (No in step S46), the object of process changes to the next ID (step S51), and the process returns to step S43.

When the "display limit" is not specified (No in step S45), or the when the "display limit" is before the present date (Yes at step S46), the process proceeds to step S47.

The information displaying unit 310 reads image information indicated by the URL (step S47), performs rendering on the image information (step S48), and displays the image information on the display unit 304 at a screen position (x, y) of the display unit 304, in a size of (w, h), and rotated by an angle of θ (step S49).

Next, when the ID value is less than the maximum ID value (No in step S50), the object of process changes to the next ID (step S51), and the process returns to step S43. On the other hand, when the ID value is greater than or equal to the maximum ID value (Yes in step S50), the process ends.

Next, the display position of image information is edited as described below, when the "edit" button is selected/pressed under a "regular" display mode. The editing unit 320 is activated when the "edit" button is selected/pressed.

According to positions touched (clicked on or selected) and dragged by a user at the input unit 301, the editing unit 320 performs the following operations on image information: (1) shifting operation, (2) magnifying/reducing operation, and (3) rotating operation.

(1) Shifting Operation

Figure 17:
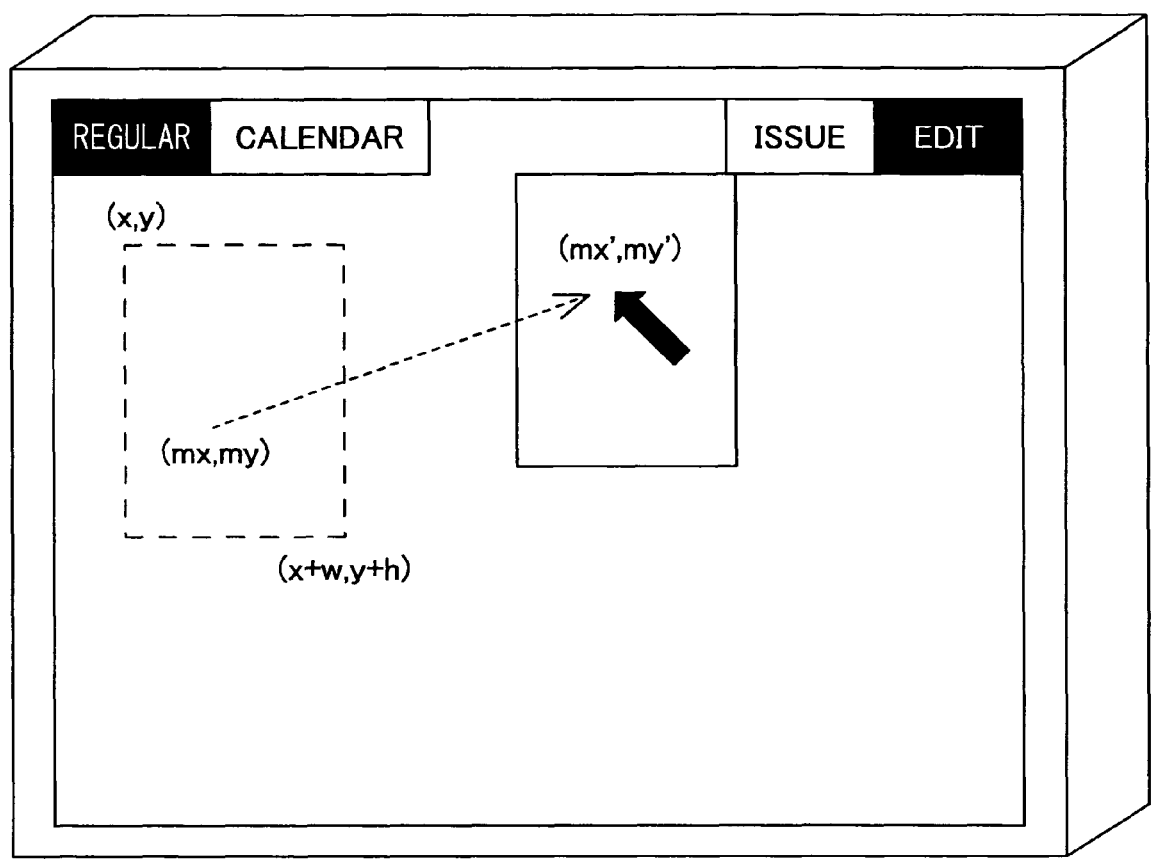
FIG. 17 is an example screen for describing a shifting operation by using an operations unit.

FIG. 17 is an example screen for describing a shifting operation by using the operations unit 302. Image information can be shifted by pressing (touching) the image information at the input unit 301, and shifting (dragging) the image information in the touched status. When the image information is released from the touched status, the image position is updated in the storage unit 303. The image position is also sent to the data updating unit 230 in the information management device 200 so as to update the image position stored in the data storing unit 220.

Figure 18:
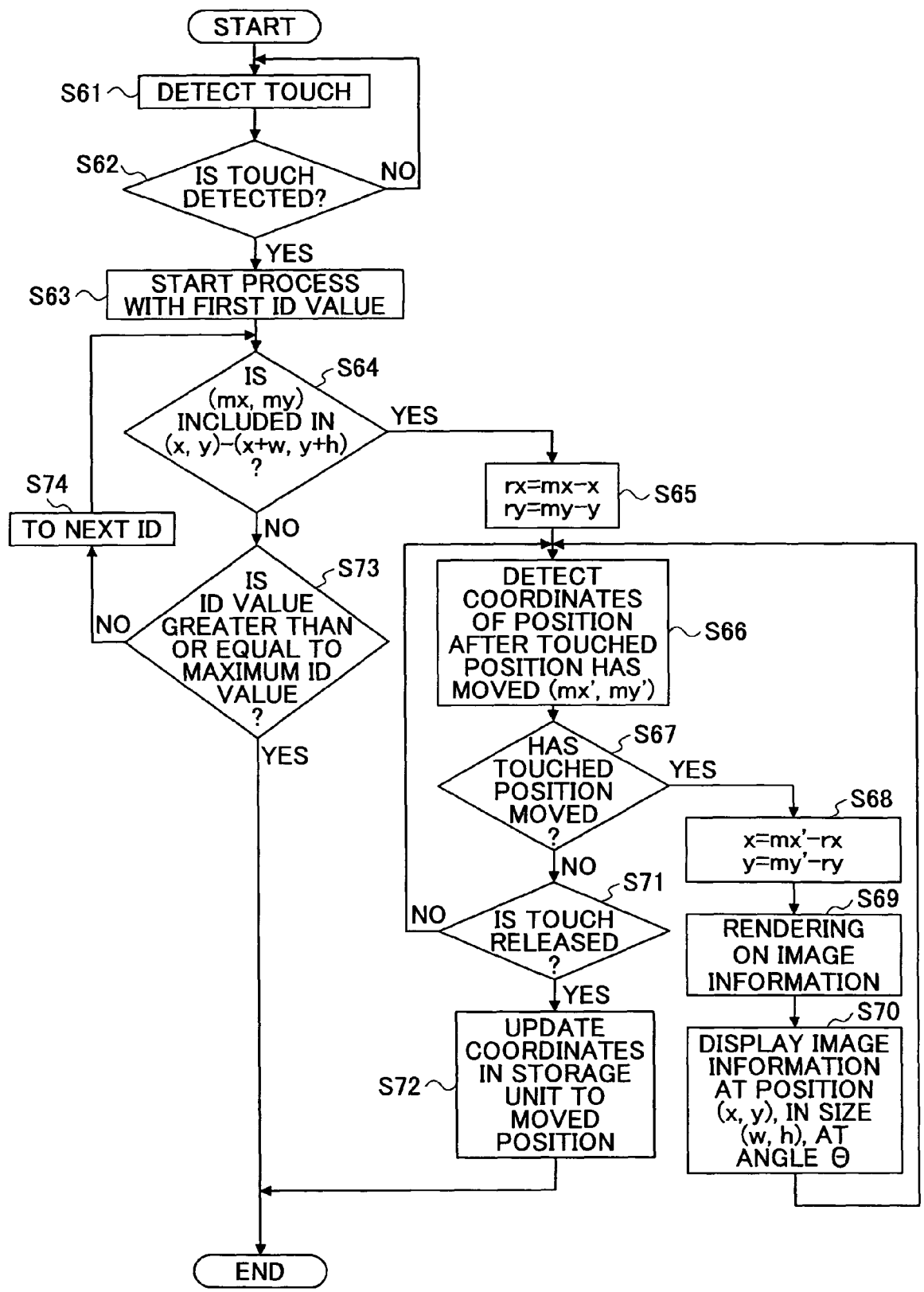
FIG. 18 is a flowchart of a process of the shifting operation performed at an editing unit.

A process of the shifting operation is described with reference to a flowchart shown in FIG. 18.

First, the editing unit 320 detects whether the input unit 301 is touched. When the input unit 301 is not touched, the detecting operation is repeated (steps S61, S62).

When the input unit 301 is touched (Yes in step S62), the editing unit 320 sequentially searches for the image information being touched, starting with image information corresponding to the first ID value (step S63).

The editing unit 320 detects the position being touched (mx, my), and determines whether the position (mx, my) is included in a rectangular area in the image information (x, y)-(x+w, y+h) (step S64).

When the editing unit 320 determines that the position (mx, my) is not included in the rectangular area (No in step S64), and the ID value of the image information is less than the maximum ID value (No in step S73), the object of process changes to the next ID (step S74), and the process returns to step S64.

However, when the ID value is greater than or equal to the maximum ID value (Yes in step S73), the process ends.

On the other hand, when the editing unit 320 determines that the position (mx, my) is included in the rectangular area (Yes in step S64), the editing unit 320 calculates a relative position rx, ry with the touched position (mx, my) and the top left coordinates of the image information (x, y) (step S65).

Next, the editing unit 320 detects coordinates of a position to which the touched position has moved (mx', my') (step S66). When the touched position has not moved (No in step S67), and the image information is not released from the touched status (No in step S71), the process returns to step S66, and the shift detection process is repeated.

When the touched position has moved (Yes in step S67), the editing unit 320 calculates the new coordinate position (x, y) from a difference between the position to which the touched position has moved (mx', my') and the previous relative position rx, ry (step S68), performs rendering on the image information (step S69), and displays the image information at the new position (x, y) in a size of (w, h), and rotated by an angle of θ (step S70). The process then returns to step S66, and the shift detection process is repeated.

When the image information is released from the touched status (Yes in step S71), the image position of this ID is updated to the coordinate position (x, y) calculated at step S68 (step S72), and the process ends. The coordinates are updated in both the storage unit 303 of the information display device 300 and the data storing unit 220 of the information management device 200.

(2) Magnifying/Reducing Operation

Figure 19:
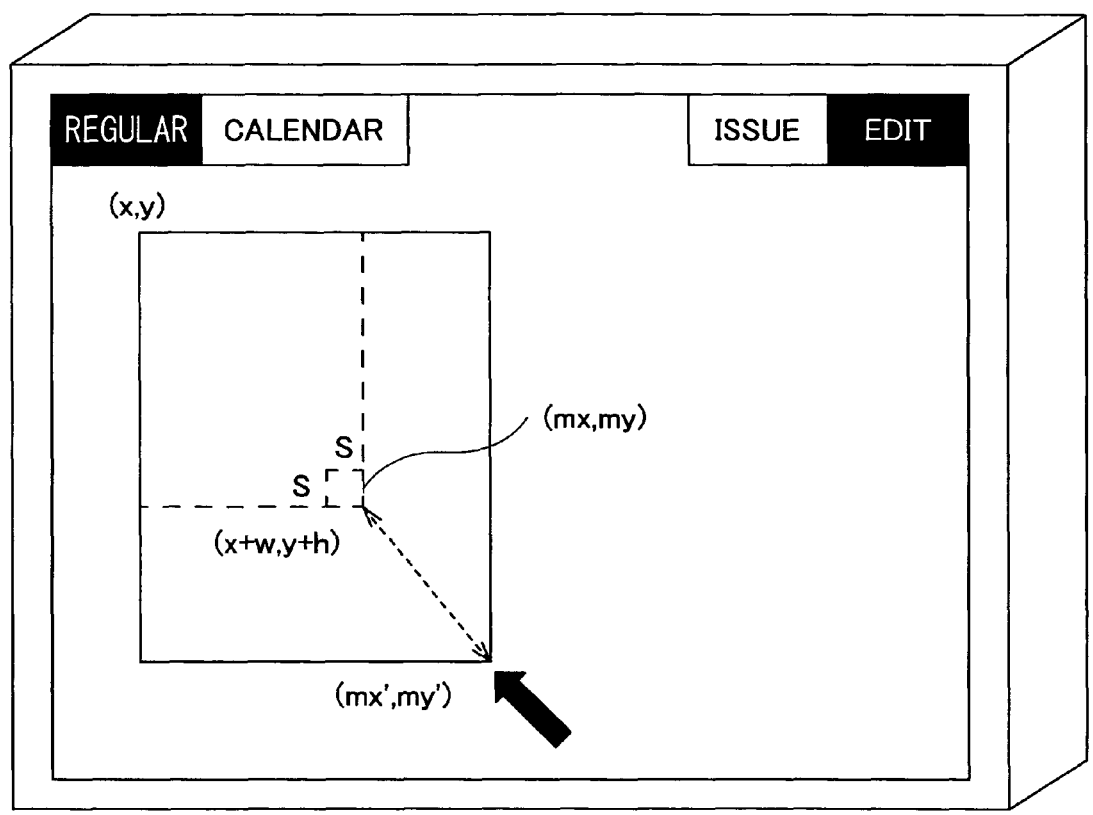
FIG. 19 is an example screen for describing a magnifying/reducing operation by using the operations unit.

FIG. 19 is an example screen for describing a magnifying/reducing operation by using the operations unit 302. Image information can be magnified/reduced by touching the bottom right edge part of the image information displayed on the screen of the input unit 301, and shifting (dragging) the image information in the touched status. When the image information is released from the touched status, the size (w, h) of the image is updated in the storage unit 303. The editing unit 320 also sends the size (w, h) of the image to the data updating unit 230 of the information management device 200 so as to update the size stored in the data storing unit 220.

Figure 20:
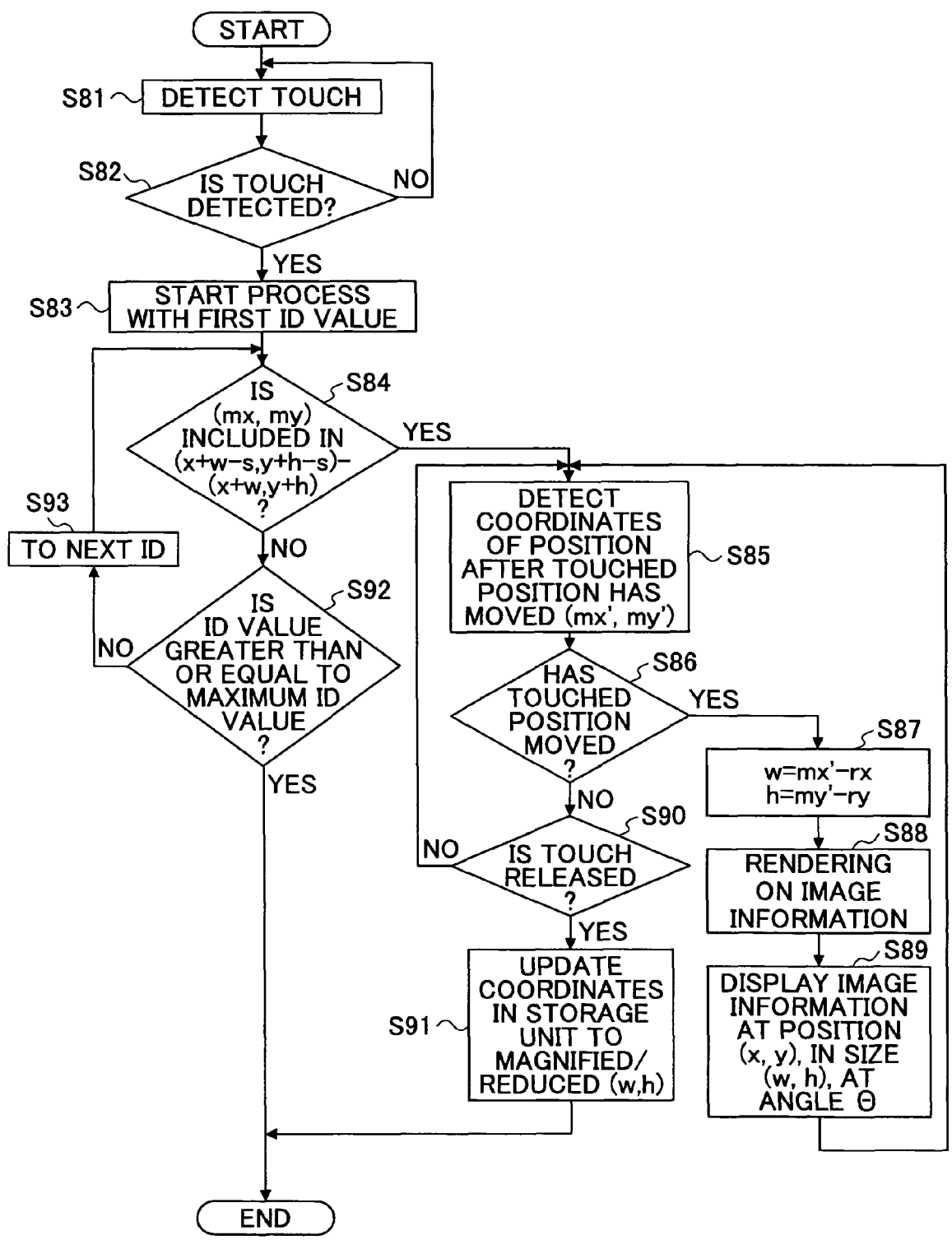
FIG. 20 is a flowchart of a process of the magnifying/reducing operation performed at the editing unit.

A process of the magnifying/reducing operation is described with reference to a flowchart shown in FIG. 20. The editing unit 320 detects whether the input unit 301 is touched. When the input unit 301 is not touched, the detecting operation is repeated (steps S81, S82).

When the input unit 301 is touched (Yes in step S82), the editing unit 320 sequentially searches for the image information being touched, starting with image information corresponding to the first ID value (step S83).

The editing unit 320 detects the position being touched (mx, my), and determines whether the position (mx, my) is included in a bottom right area of a rectangular area in the image information (x+w-s, y+h-s)-(x+w,y+h), where s represents the width of the bottom right area (step S84).

When the editing unit 320 determines that the position (mx, my) is not included in the bottom right area of the rectangular area (No in step S84), and the ID value of the image information is less than the maximum ID value (No in step S92), the object of process changes to the next ID (step S93), and the process returns to step S84. However, when the ID value is greater than or equal to the maximum ID value (Yes in step S92), the process ends.

On the other hand, when the editing unit 320 determines that the position (mx, my) is included in the bottom right area of the rectangular area of a particular ID (Yes in step S84), the editing unit 320 detects coordinates of a position to which the touched position has moved (mx, my) (step S85). When the touched position has not moved (No in step S86), and the image information is not released from the touched status (No in step S90), the process returns to step S85, and the shift detection process is repeated.

When the touched position has moved (Yes in step S86), the editing unit 320 calculates the new size of the image information (w, h) from a difference between the position to which the touched position has moved (mx', my') and (x, y) (step S87), performs rendering on the image information (step S88), and displays the image information at (x, y) by the new size of (w, h), and rotated by an angle of θ (step S89). The process then returns to step S85, and the shift detection process is repeated.

When the image information is released from the touched status (Yes in step S90), the size (w, h) of the image position of this ID is updated to the size (w, h) of the image information calculated at step S87 (step S91), and the process ends. The size of the image information is updated in both the storage unit 303 of the information display device 300 and the data storing unit 220 of the information management device 200.

(3) Rotating Operation

Figure 21:
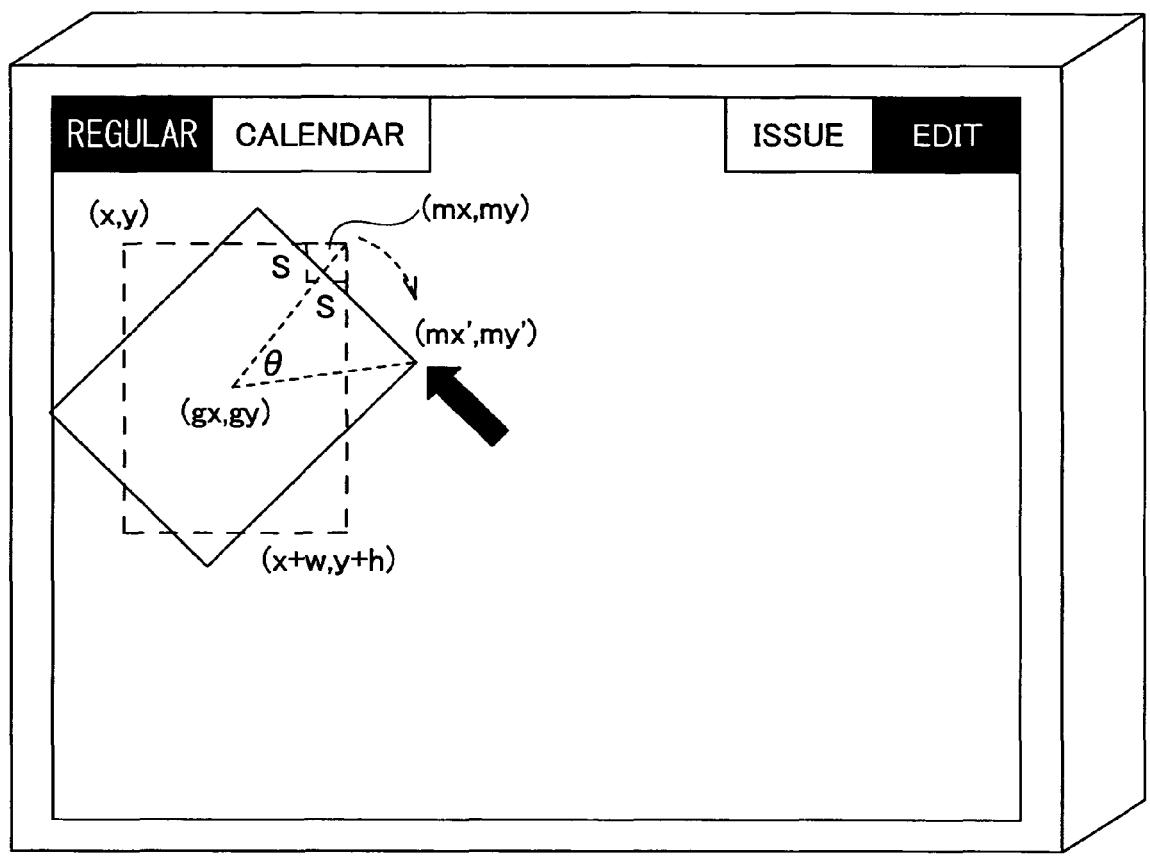
FIG. 21 is an example screen for describing a rotating operation by using the operations unit.

FIG. 21 is an example screen for describing a rotating operation by using the operations unit 302. Image information can be rotated by touching the top right edge part of the image information displayed on the screen of the input unit 301, and shifting (dragging) the image information in the touched status. When the image information is released from the touched status, the rotational angle of the image is updated in the storage unit 303. The image position is also sent to the data updating unit 230 in the information management device 200 so as to update the rotational angle stored in the data storing unit 220.

Figure 22:
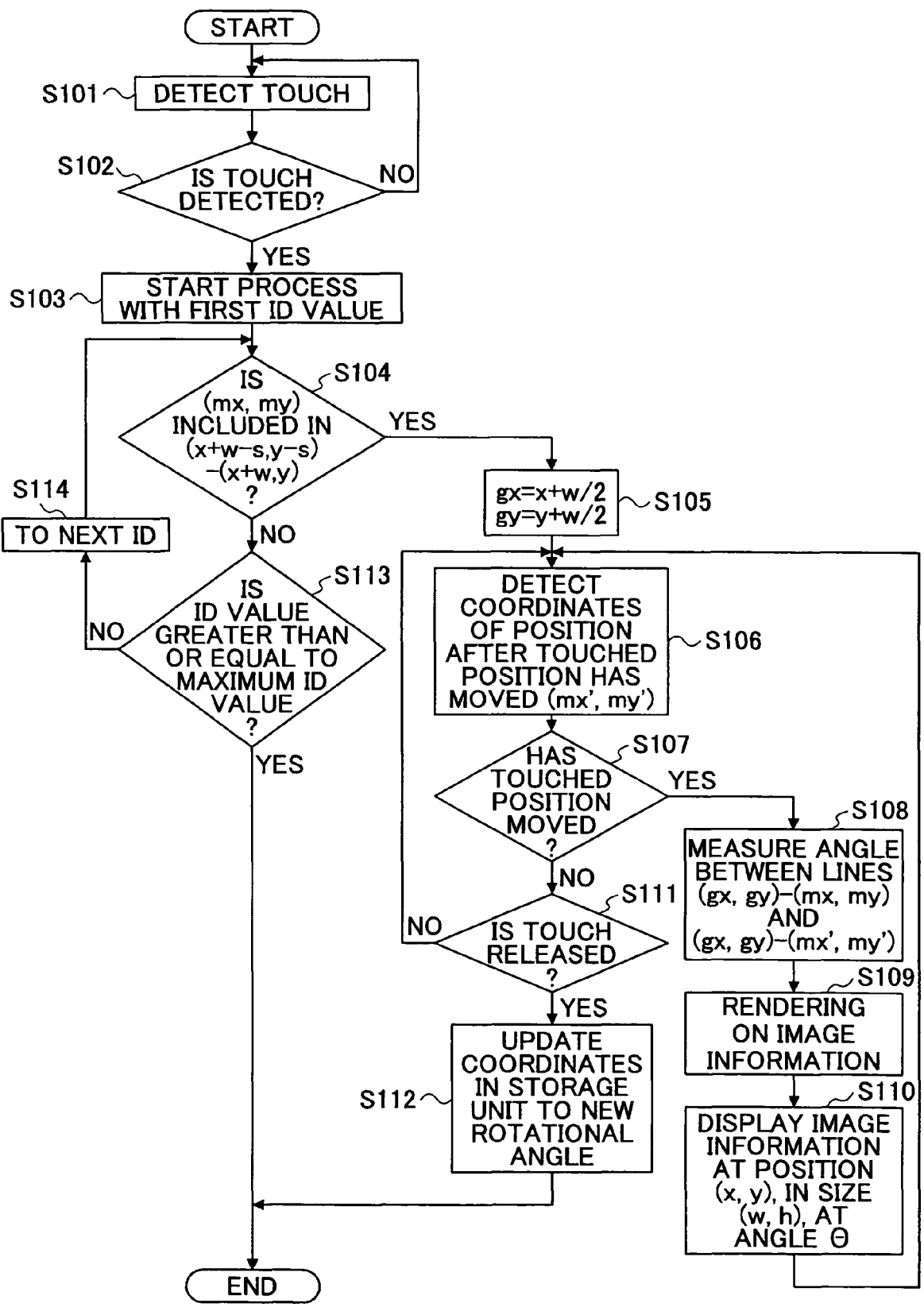
FIG. 22 is a flowchart of a process of the rotating operation performed at the editing unit.

A process of the rotating operation is described with reference to a flowchart shown in FIG. 22.

The editing unit 320 detects whether the input unit 301 is touched. When the input unit 301 is not touched, the detecting operation is repeated (steps S101, S102).

When the input unit 301 is touched (Yes in step S102), the editing unit 320 sequentially searches for the image information being touched, starting with image information corresponding to the first ID value (step S103).

The editing unit 320 detects the position being touched (mx, my), and determines whether the position (mx, my) is included in a top right area of a rectangular area in the image information (x+w-s,y-s)-(x+w,y), where s represents the width of the top right area (step S104). When the editing unit 320 determines that the position (mx, my) is not included in the top right area of the rectangular area (No in step S104), and the ID value of the image information is less than the maximum ID value (No in step S113), the object of process changes to the next ID (step S114), and the process returns to step S104.

However, when the ID value is greater than or equal to the maximum ID value (Yes in step S113), the process ends.

On the other hand, when the editing unit 320 determines that the position (mx, my) is included in the top right area of the rectangular area of a particular ID (Yes in step S104), the editing unit 320 calculates the centroid position (gx, gy) of the touched image information (step S105).

Next, the editing unit 320 detects coordinates of a position to which the touched position has moved (mx', my') (step S106). When the touched position has not moved (No in step S107), and the image information is not released from the touched status (No in step S111), the process returns to step S106, and the shift detection process is repeated.

When the touched position has moved (Yes in step S107), the editing unit 320 calculates an angle $\theta$ between a line connecting the centroid position (gx, gy) and the initially touched position (mx, my) and a line connecting the centroid position (gx, gy) and the new touched position (mx', my') (step S108), performs rendering on the image information (step S109), and displays the image information at the new position (x, y) in a size of (w, h), and rotated by an angle of $\theta$ (step S110). The process then returns to step S106, and the shift detection process is repeated.

When the image information is released from the touched status (Yes in step S111), the rotational angle $\theta$ of the image of this ID is updated to the rotational angle calculated at step S108 (step S112), and the process ends. The rotational angle is updated in both the storage unit 303 of the information display device 300 and the data storing unit 220 of the information management device 200.

Next, a description is given of a zooming display of image information when the "issue" button is selected/pressed under a "regular" display mode. The issuing unit 330 is activated by selecting/pressing the "issue" button.

The issuing unit 330 performs (1) a zoom-in process or (2) a zoom-out process on image information touched at the input unit 301.

Figure 23A:
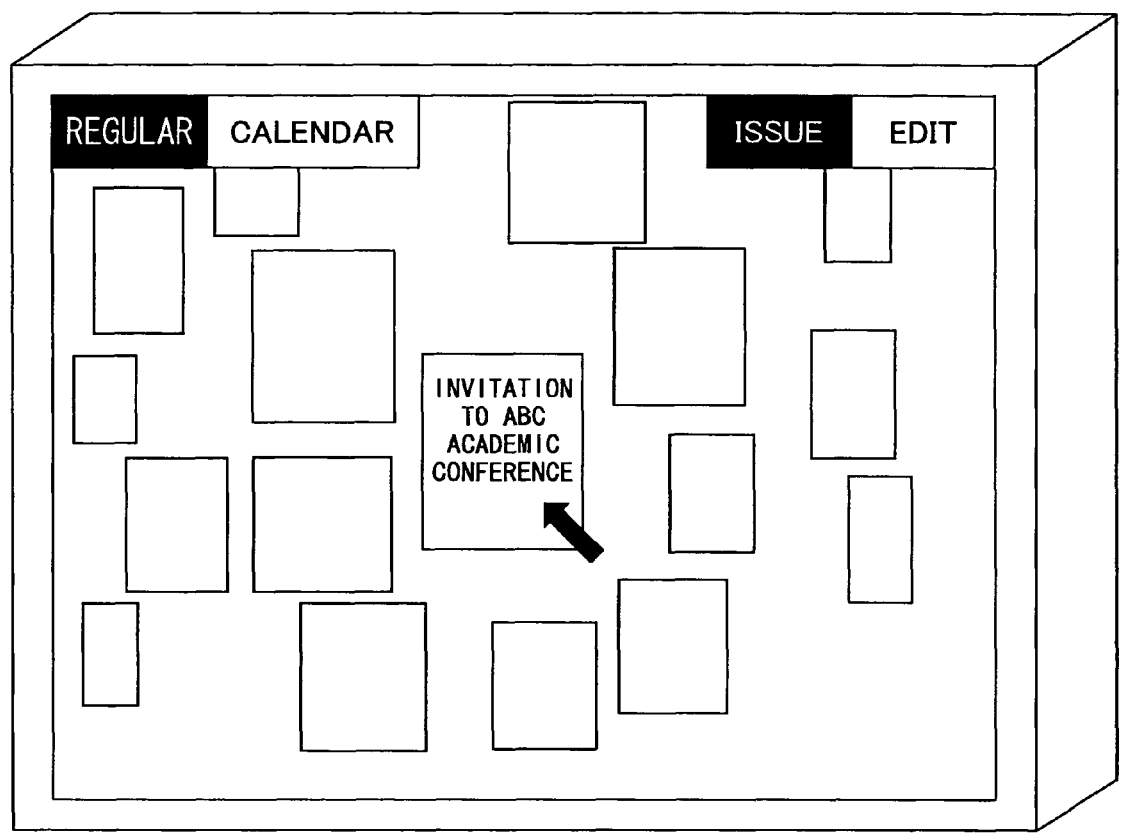
FIGS. 23A, 23B are example screens for describing a zoom-in process.
Figure 23B:
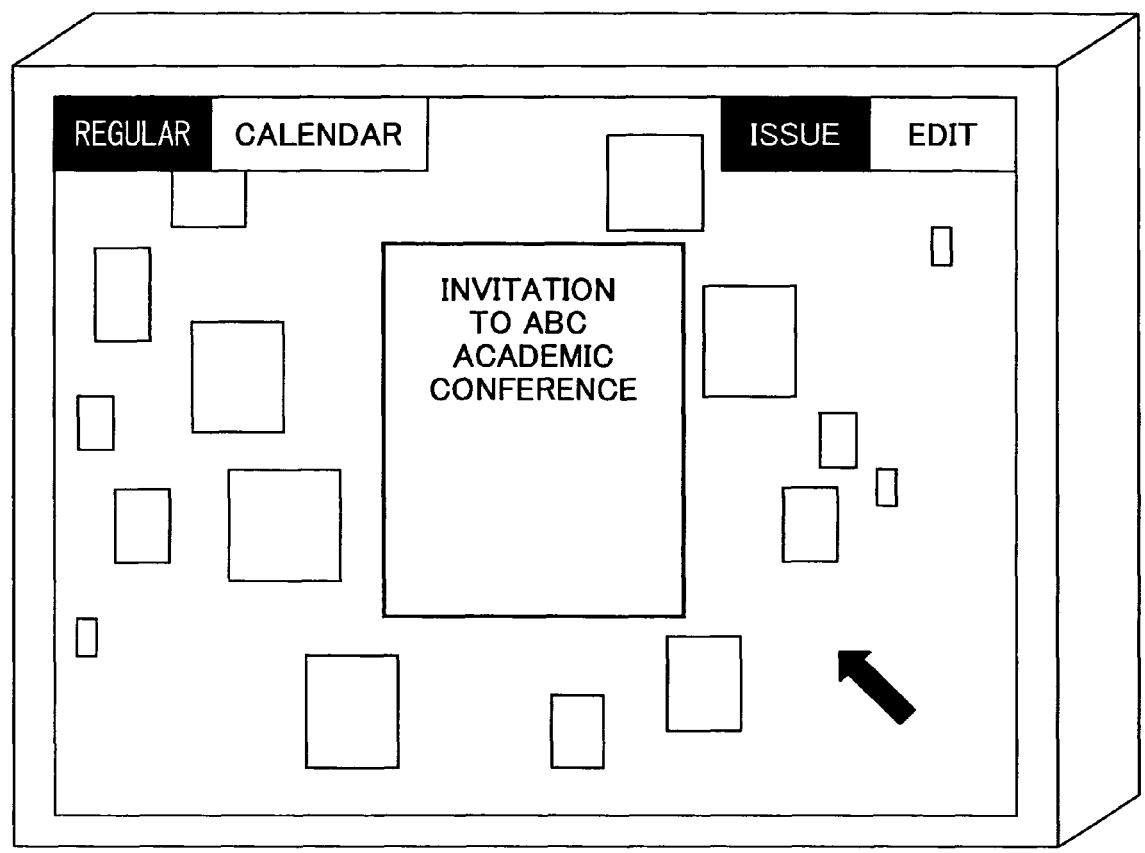

FIGS. 23A, 23B are example screens for describing a zoom-in process. When a user touches a particular image at the input unit 301 (FIG. 23A), the image is zoomed-in (magnified) in the middle of the display unit, so that other images appear to be relatively reduced (FIG. 23B).

When an area other than images is touched in the zoomed-in condition shown in FIG. 23B, the magnified image is zoomed out (reduced) to return to the condition shown in FIG. 23A.

By touching another image while the first image is zoomed-in as shown in FIG. 23B, the other touched image is zoomed-in (magnified), and the image zoomed in first is reduced again.

(1) Zoom-in Process

A zoom-in process performed by the issuing unit 330 is described with reference to flowcharts shown in FIGS. 24, 25.

First, the issuing unit 330 detects whether the input unit 301 is touched. When the input unit 301 is not touched, the detecting operation is repeated (steps S121, S122).

When the input unit 301 is touched (Yes in step S122), the issuing unit 330 sequentially searches for the image information being touched, starting with image information corresponding to the first ID value (step S123).

The issuing unit 330 detects the position being touched (mx, my), and determines whether the position (mx, my) is included in a rectangular area in the image information (x, y)-(x+w, y+h) (step S124).

When the issuing unit 330 determines that the position (mx, my) is not included in the rectangular area (No in step S124), and the ID value of the image information is less than the maximum ID value (No in step S130), the object of process changes to the next ID (step S131), and the process returns to step S124.

However, when the ID value is greater than or equal to the maximum ID value (Yes in step S130), the issuing unit 330 determines that an area other than images has been touched, performs a zoom-out process (step S132), and the process ends.

On the other hand, when the issuing unit 330 determines that the position (mx, my) is included in the rectangular area (Yes in step S124), the issuing unit 330 calculates the centroid position (sgx, sgy) of the selected image touched at S122 (step S125), and calculates a distance range R (step S126). The distance range R is a physical distance in which zooming can be performed as shown in FIGS. 23A, 23B, which is a predetermined multiplying factor (e.g., 0.7 times) of a width PW of the display unit.

Next, the issuing unit 330 calculates the magnified size of the selected image by multiplying the width and the height of the selected image by a predetermined multiplying factor (e.g., 2 times) to obtain a new nw and nh (step S127). The issuing unit 330 calculates coordinates (x, y) corresponding to the top left corner when the image is magnified (step S128).

The centroid position (sgx, sgy) of the selected image, the top left coordinates (x, y) of the image when magnified, the size (nw, nh) of the image when magnified, and the distance range R are used to perform calculation for all of the other images, all images are displayed according to results of the calclulation (step S129), and the process ends.

Figure 24:
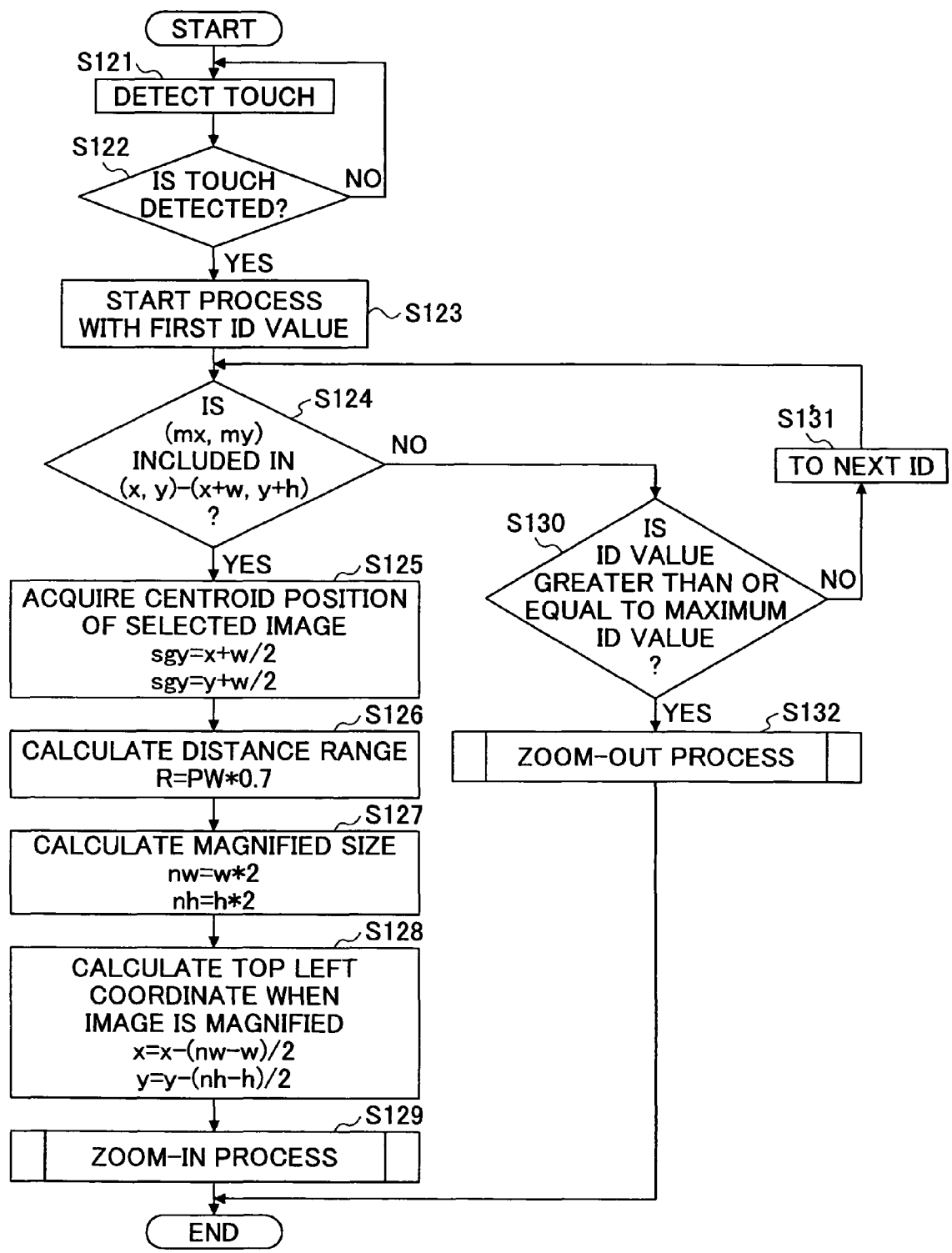
FIG. 24 is a flowchart of a zoom-in process performed by an issuing unit under a "regular" mode (process for specifying image information)
Figure 25:
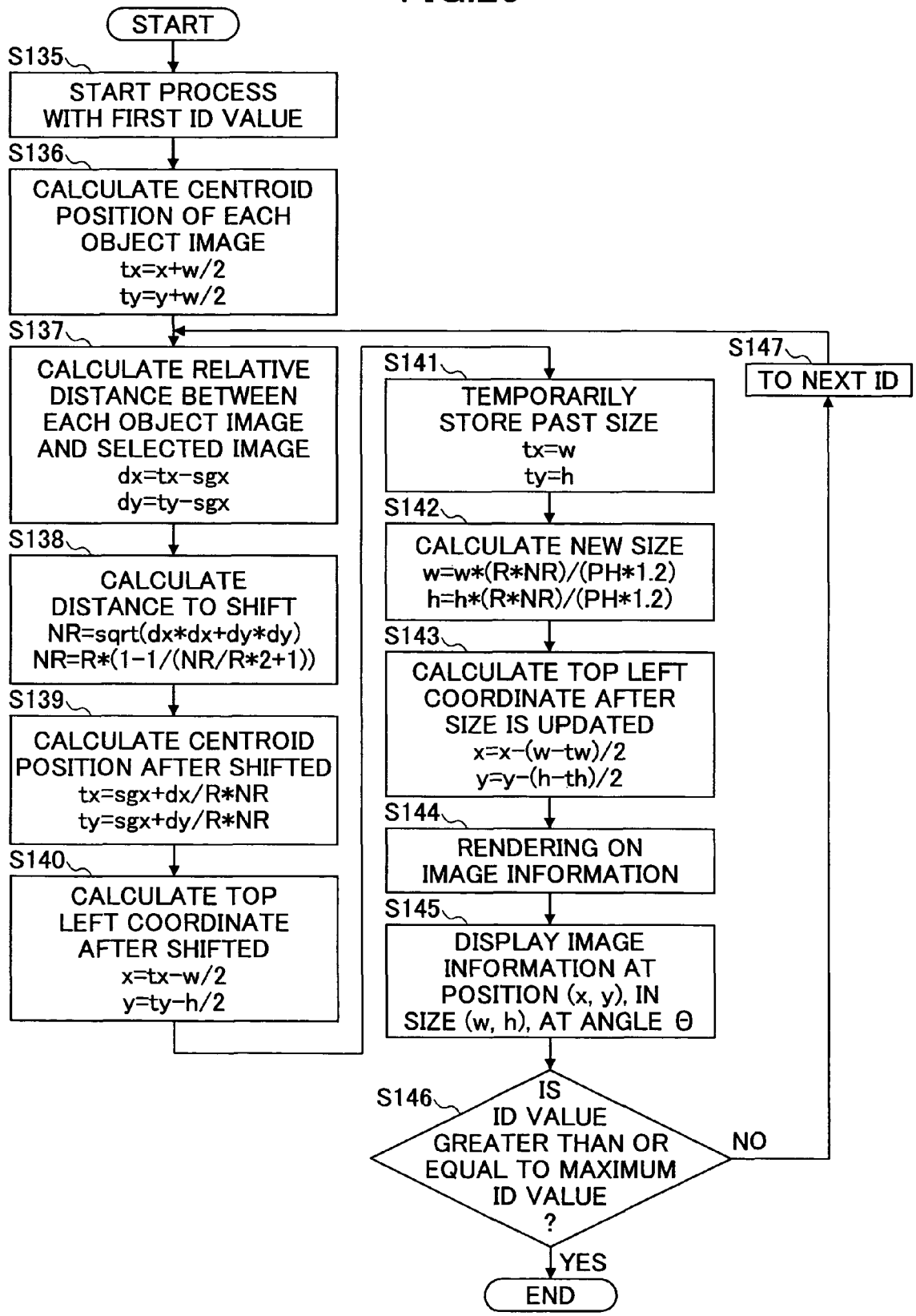
FIG. 25 is a detailed flowchart of a process performed at step S129 in FIG. 24 (zoom-in process for image information)

Step S129 in FIG. 24 is described in detail with reference to the flowchart shown in FIG. 25.

All image information is sequentially displayed by the following process, starting with the image information corresponding to the first ID value (step S135).

The issuing unit 330 calculates the centroid position (tx, ty) of the image of the ID that is the object of the process (hereinafter, object image) (step S136). The issuing unit 330 calculates the relative distance dx, dy between the centroid position of the object image and the centroid position of the selected image touched at S122 in FIG. 24 (step S137).

Next, the issuing unit 330 calculates a distance NR by which the object image is to be shifted with formula 1 (step S138). The longer the distance between the object image and the selected image, the shorter the shifting distance NR; i.e., NR is obtained as an inversely proportional value to the distance between the object image and the selected image.

$$NR = R \times \left(1 - \frac{1}{\frac{2\sqrt{dx^2 + dy^2}}{R} + 1}\right) \quad \text{[Formula 1]}$$

Next, the issuing unit 330 calculates a new centroid position (tx, ty) of the object image at the shifted position (step S139), and calculates new top left coordinates (x, y) of the object image at the shifted position (step S140).

The size w, h of the object image is temporarily stored as tw, th (step S141), and the issuing unit 330 calculates the new size of the object image (step S142). The closer the object image is to the selected image, the larger the calculated size of the object image.

Next, the issuing unit 330 calculates top left coordinates (x, y) of a rectangle of the object image when the size is updated (step S143), performs rendering on image information of the object image of the updated size (step S144), and displays the object image at the calculated new position (x, y), in the calculated new size of (w, h), and rotated by an angle of θ (step S145).

When the ID value is less than the maximum ID value (No in step S146), the object of the process changes to the next ID (step S147), and the process returns to step S137.

On the other hand, when the ID value is greater than or equal to the maximum ID value (Yes in step S146), the process ends.

(2) Zoom-Out Process

When the issuing unit 330 detects that an area other than images is touched in the zoomed-in condition shown in FIG. 23B, the issuing unit 330 performs the zoom-out process by displaying all of the images in their original size.

The following is a description of an image information output process when the editing mode of the information display device 300 is "issue".

Figure 26:
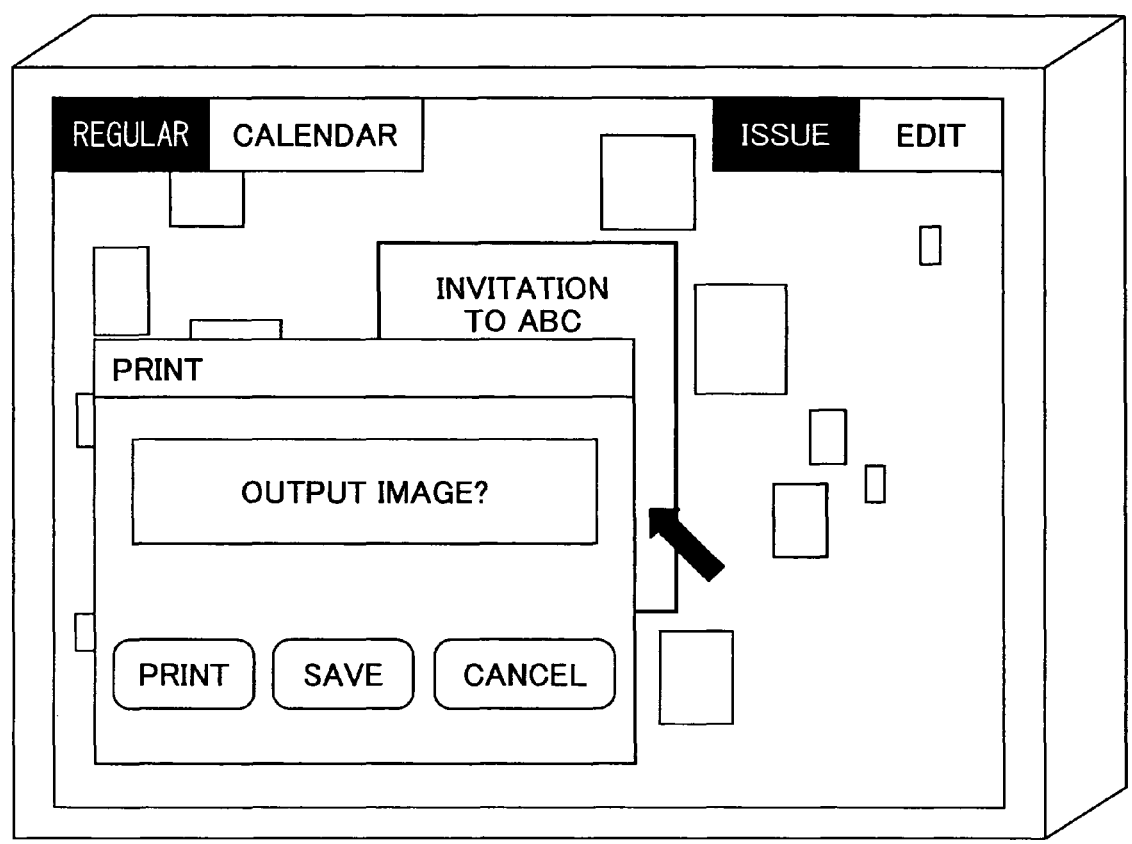
FIG. 26 is an example screen for describing a dialogue window displayed for instructing whether to output zoomed-in image information.

In the mode shown in FIG. 23B, the issuing unit 330 detects that the input unit 301 is touched. When an image (selected image) is touched, the issuing unit 330 displays a dialogue window including a "print" button, a "save" button, and a "cancel" button, as shown in FIG. 26.

When the "print" button is pressed, the issuing unit 330 acquires an ID of the selected image, reads image information of the corresponding ID from the storage unit 303, and sends the image information to a printing device (e.g., a printer) connected to a network, a COM port, or a printer port via the communication unit 305, so that the image information is printed out.

When the "save" button is pressed, the issuing unit 330 acquires an ID of the selected image, reads image information of the corresponding ID from the storage unit 303, and sends the image information to an information processing device (e.g., a PC) connected to a network via the communication unit 305, so that the image information is saved in a recording medium provided in the information processing device.

When the "cancel" button is pressed, the selected image information is not output, and the process ends.

The above-described operations are performed when the information display device 300 is in a "regular" display mode. The following operations are performed when the information display device 300 is in a "calendar" display mode.

In the information display device 300, when the "calendar" button is selected/pressed at the input unit 301, the information displaying unit 310 is activated.

Figure 27:
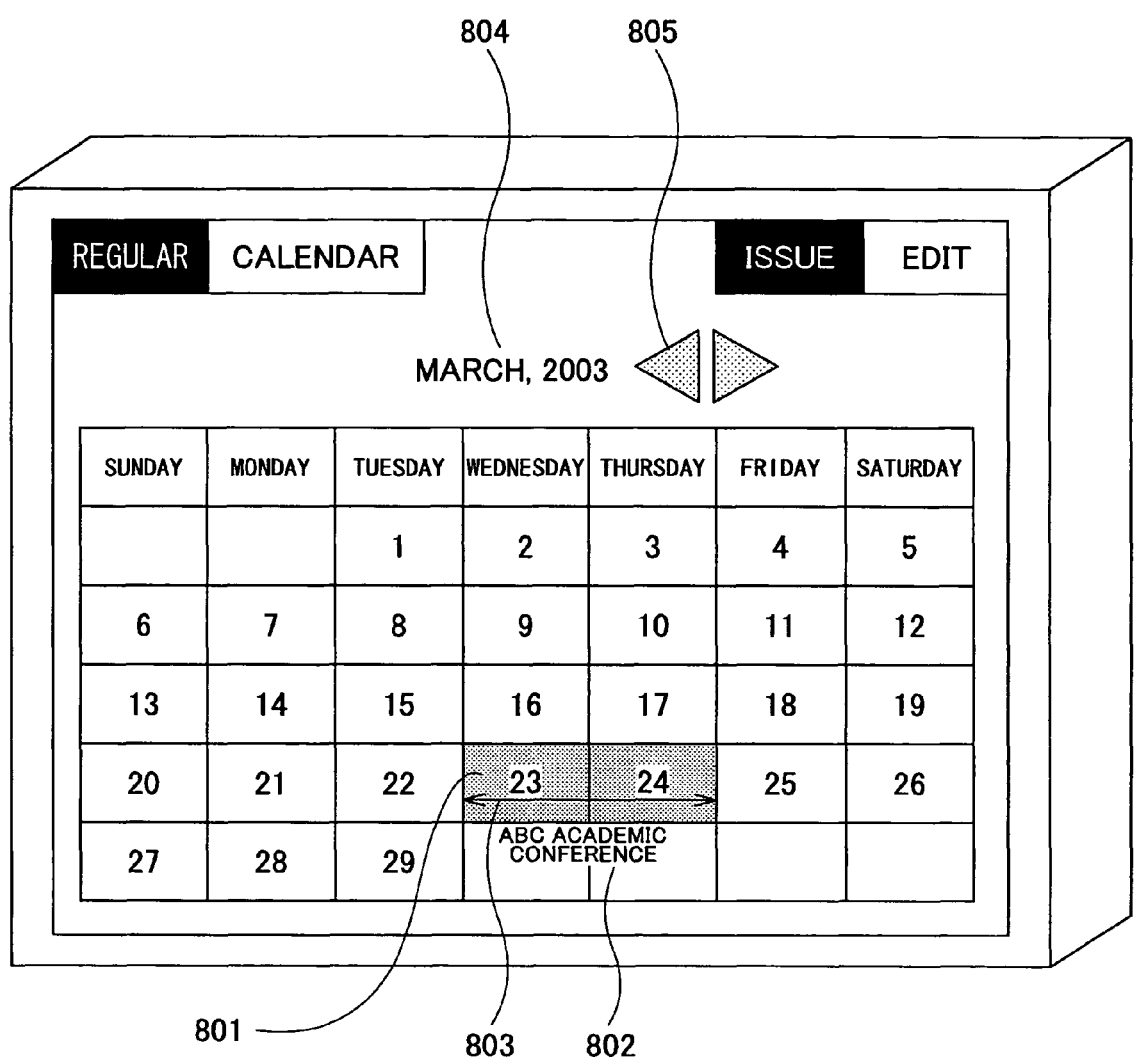
FIG. 27 is an example screen of a mode when a "calendar" button is pressed.

When the "calendar" button is pressed, the information displaying unit 310 displays a monthly calendar including the present date, as shown in an example of FIG. 27. In an area 801 corresponding to the date(s) of the schedule, the title of the schedule is shown by information 802, and the period of the schedule is indicated by an arrow 803. Character strings 804 indicate the year and month of the calendar, and buttons 805 used for selecting a month or year are displayed near the character strings 804.

Figure 28:
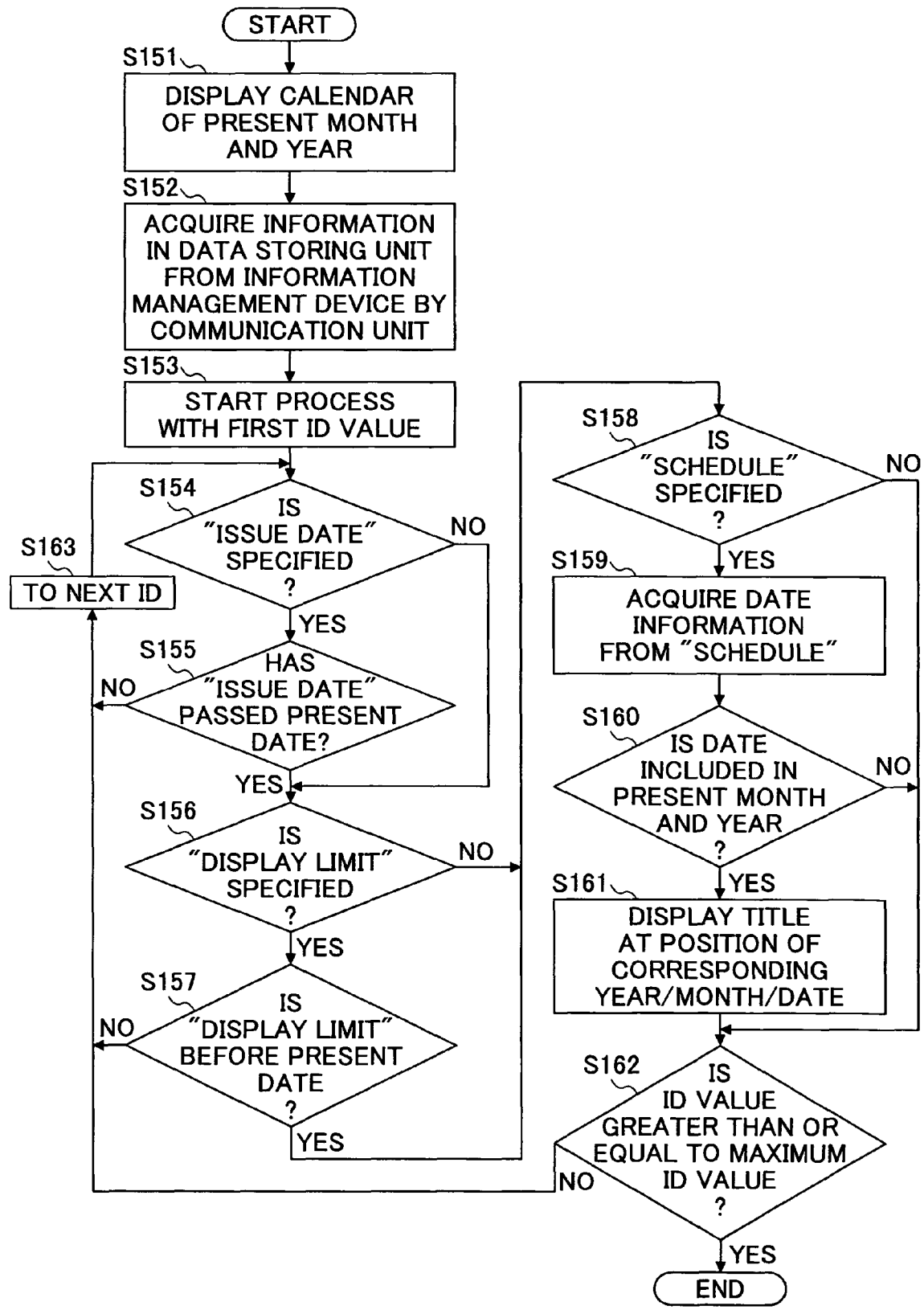
FIG. 28 is a flowchart of a process performed by the information display unit when the "calendar" button is pressed.

A process performed by the information displaying unit 310 is described with reference to a flowchart shown in FIG. 28.

When the display mode switches to "calendar", the information displaying unit 310 displays the present month and year (step S151), and requests the data transferring unit 240 of the information management device 200 to transfer all data stored in the data storing unit 220, via the communication unit 305 of the information display device 300. The information displaying unit 310 stores the received data in the storage unit 303 (step S152).

Next, the information displaying unit 310 sequentially performs the process starting with data corresponding to the first ID value recorded in the storage unit 303 (step S153).

When the "issue date" of the ID is not specified (No in step S154), the process proceeds to step S156. On the other hand, when the "issue date" of the ID is specified (Yes in step S154), and the "issue date" has not passed the present date (No in step S155), the object of process changes to the next ID (step S163), and the process returns to step S154.

On the other hand, when the "issue date" has passed the present date (Yes in step S155), the process proceeds to step S156.

When the "display limit" is specified (Yes in step S156), and the "display limit" is not before the present date (No in step S157), the object of process changes to the next ID (step S163), and the process returns to step S154.

When the "display limit" is not specified (No in step S156), or the when the "display limit" is before the present date (Yes at step S157), the process proceeds to step S158.

When "schedule" information of the ID is registered (Yes in step S158), the information displaying unit 310 acquires date information from the schedule (step S159). This can be done by extracting a character string corresponding to year/month/date from character strings in the "schedule". For example, when a character string "2003/12/23-24 academic conference" is registered in the schedule, the first four digit number separated by a "/ (slash)" is extracted as the year, the next two digit number is extracted as the month, and the next two digit number is extracted as the date.

Next, when the extracted date is included in the present month and year (Yes in step S160), a "title" or visual information such as arrows representing the period are displayed in a position of the calendar corresponding to the year/month/date extracted from the schedule (step S161), the process proceeds to step S162.

When "schedule" is not specified (No in step S158), or when the extracted date is not included in the present month and year (No in step S160), the process proceeds to step S162.

Next, when the ID value is less than the maximum ID value (No in step S162), the object of process changes to the next ID (step S163), and the process returns to step S154. On the other hand, when the ID value is greater than or equal to the maximum ID value (Yes in step S162), the process ends.

Next, a description is given of a method of displaying image information corresponding to a particular schedule, when the information display device 300 is in a "calendar" display mode as shown in FIG. 27.

Figure 29:
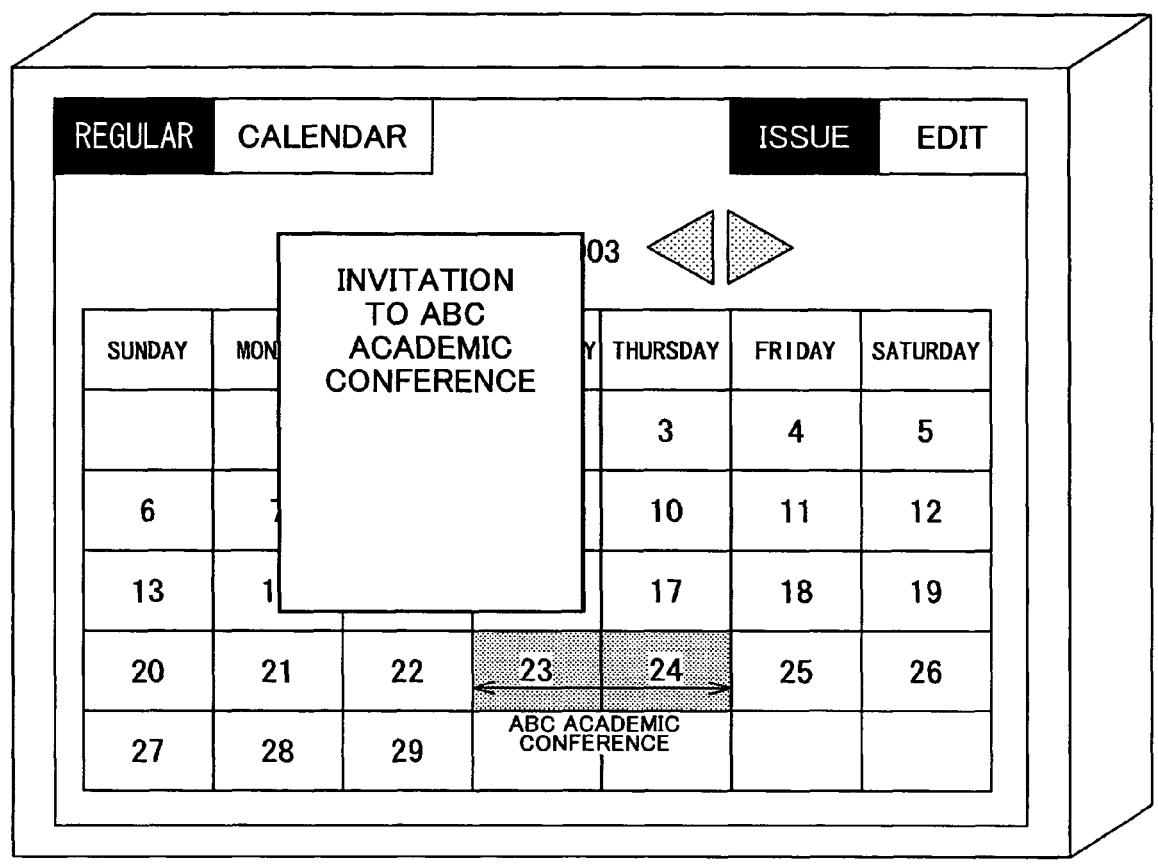
FIG. 29 is an example screen when image information is popped up in a "calendar" display mode.

When the information displaying unit 310 detects that a particular schedule information item displayed on the display unit is touched at the input unit 301 (for example, the area 802 corresponding to a title "ABC Academic Conference" scheduled on Mar. 23rd to 24th, 2003, is touched), the image information corresponding this schedule is displayed in a pop-up, as shown in FIG. 29.

Figure 30:
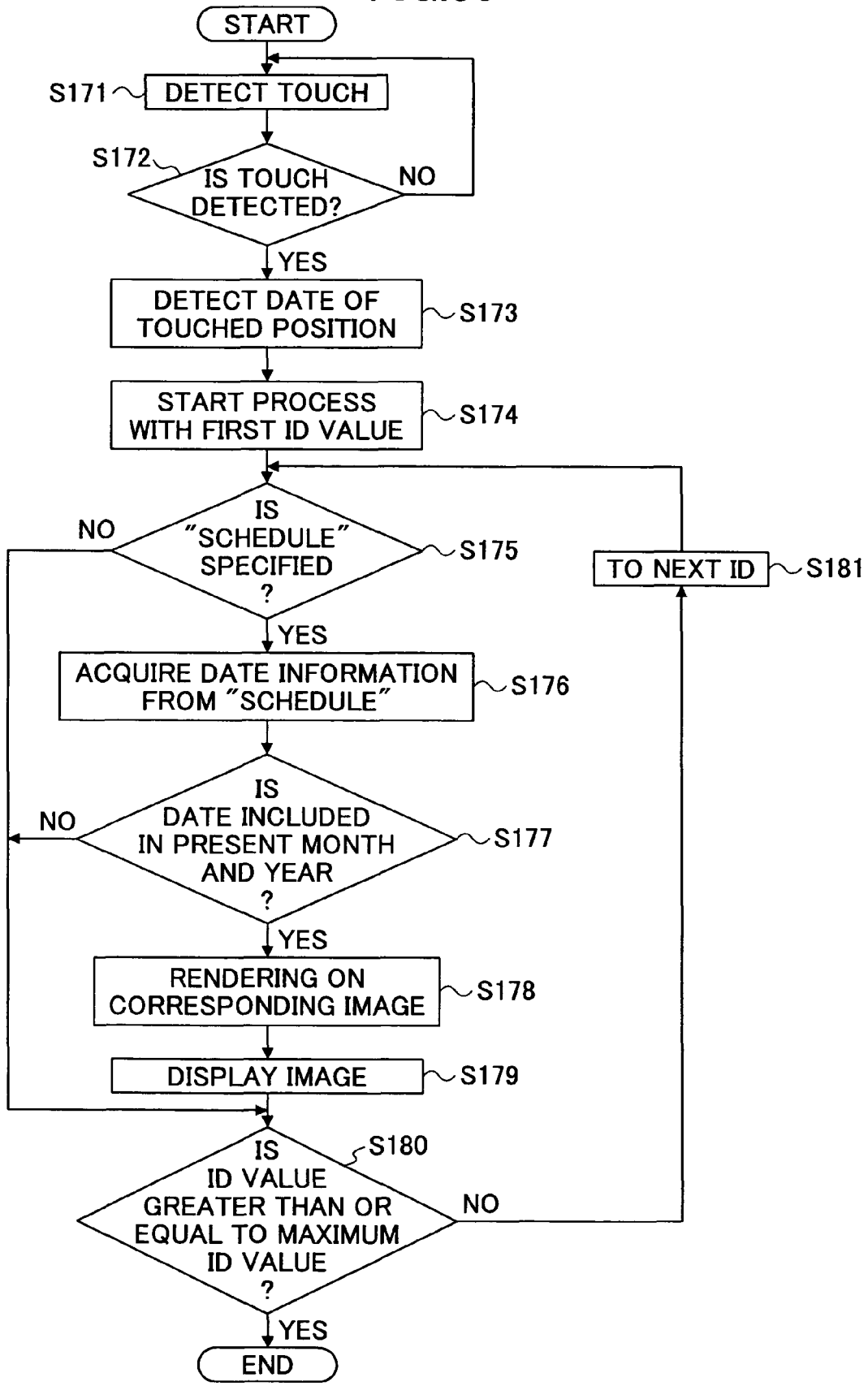
FIG. 30 is a flowchart of a process of popping up image information in the "calendar" display mode.

A process of displaying image information of a particular schedule in a "calendar" display mode is described with reference to a flowchart shown in FIG. 30.

First, the information displaying unit 310 detects whether the input unit 301 is touched. When the input unit 301 is not touched, the detecting operation is repeated (steps S171, S172).

When the input unit 301 is touched (Yes in step S172), the information displaying unit 310 detects the touched date based on rectangular areas representing dates and the touched position in the displayed calendar (step S173), and sequentially searches for the image information being touched, starting with image information corresponding to the first ID value (step S174).

When "schedule" information of the ID is registered (Yes in step S175), the information displaying unit 310 acquires date information from the schedule (step S176). For example, when a character string "2003/12/23-24 academic conference" is registered in the schedule, the first four digit number separated by a "/ (slash)" is extracted as the year, the next two digit number is extracted as the month, and the next two digit number is extracted as the date.

Next, when the extracted date is included in the present month and year (Yes in step S177), the information displaying unit 310 performs rendering on the image information corresponding to the ID (step S178), displays the rendered image (step S179), and the process proceeds to step S180.

When "schedule" is not specified (No in step S175), or when the extracted date is not included in the present month and year (No in step S177), the process proceeds to step S180.

Next, when the ID value is less than the maximum ID value (No in step S180), the object of process changes to the next ID (step S181), and the process returns to step S175. On the other hand, when the ID value is greater than or equal to the maximum ID value (Yes in step S180), the process ends.

The information issue device 100 and the information display device 300 described above do not include a user recognition unit.

As a result, the schedule acquiring unit 110 of the information issue device 100 acquires schedule information of all users, and it is therefore troublesome for a user to find his/her own schedule.

Further, even confidential image information that the user desires to conceal may be displayed in a zoomed-in condition by the issuing unit 330 of the information display device 300.

Figure 31:
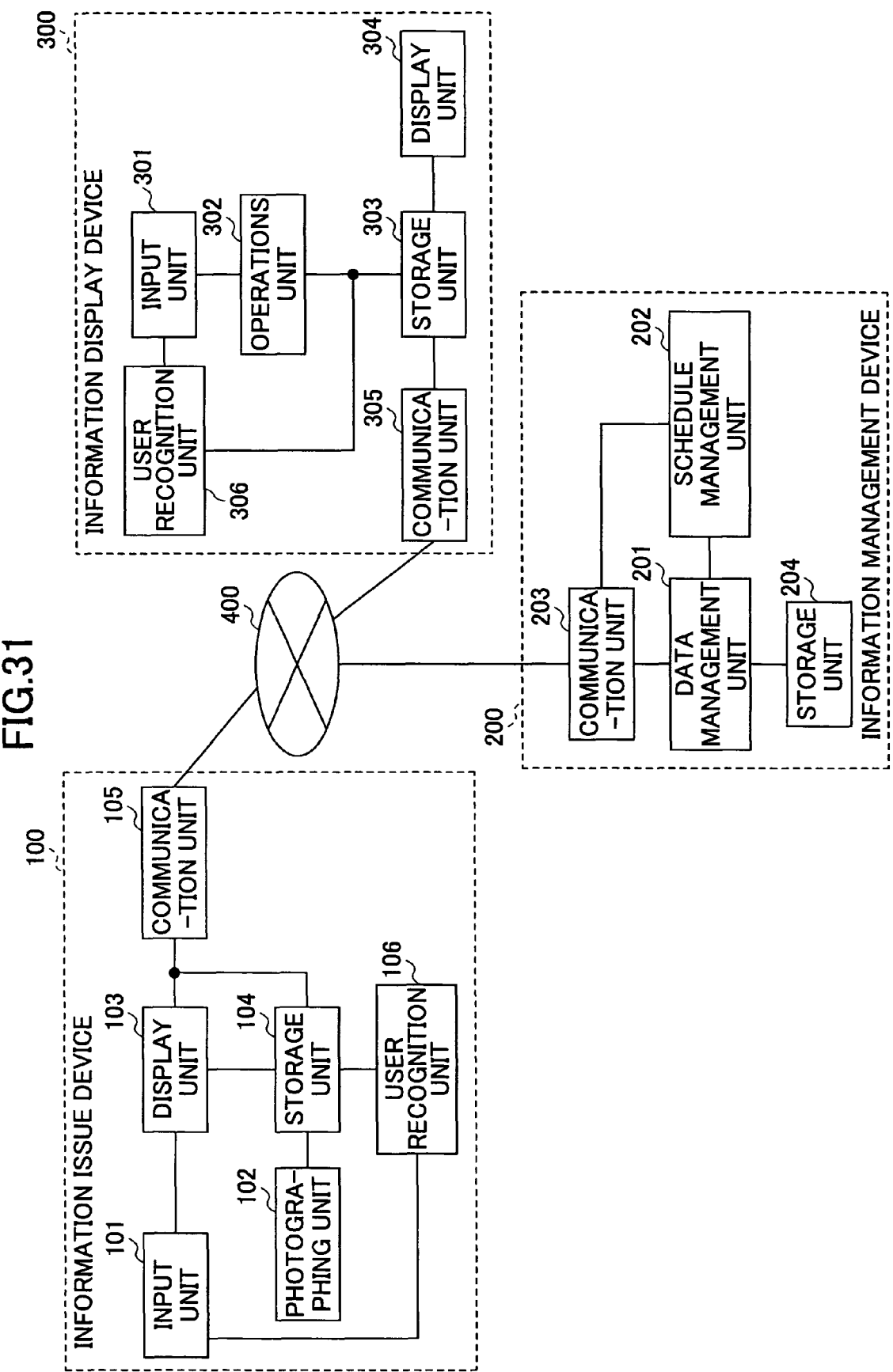
FIG. 31 is a block diagram of the information display system according the first embodiment including user recognition units.

Accordingly, as shown in FIG. 31, a user recognizing unit 106 and a user recognizing unit 306 are provided in the information issue device 100 and the information display device 300, respectively. In FIG. 31, elements corresponding to those in FIG. 1 are denoted by the same reference numbers, and are not further described.

The user recognizing unit 106 and the user recognizing unit 306 are used for identifying users of the information display system, and are realized by conventional devices such as RFID, active RFID, an IC card or biometrics, which identify/verify individuals.

The user recognizing unit 106 in the information issue device 100 identifies a user with the above technology via the input unit 101. When there are plural users around the information issue device 100, the user recognizing unit 106 acquires identification information of the plural users.

The schedule acquiring unit 110 verifies the user (or users) identified by the user recognizing unit 106 with the "user" field in the schedule information acquired from the schedule storing unit 260 of the information management device 200, extracts only schedule information of the matching user(s), and generates and displays schedule labels.

The user recognizing unit 306 in the information display device 300 identifies a user with the above technology via the input unit 301. When plural users are around the information display device 300, the user recognizing unit 306 acquires identification information of the plural users.

Only when the user (or users) identified by the user recognizing unit 306 matches the "user" in the data recorded in the storage unit 303, the information displaying unit 310 performs rendering on the image information of the user, and displays the rendered image information.

Accordingly, it is possible to display only image information of the user (or users) near the information display device 300.

Only when the user (or users) identified by the user recognizing unit 306 matches the "user" in the data recorded in the storage unit 303, the issuing unit 330 displays the image information of the user in a zoomed-in (magnified) condition.

Accordingly, it is possible to display confidential information only to particular users. For example, images of documents related to a particular meeting can be displayed only for users related to the meeting, and can also be saved and printed.

Second Embodiment

In the information display system according to the first embodiment, the information issue device, the information management device, and the information display device are independent devices connected via the network, as shown in FIGS. 1, 31.

Figure 32:
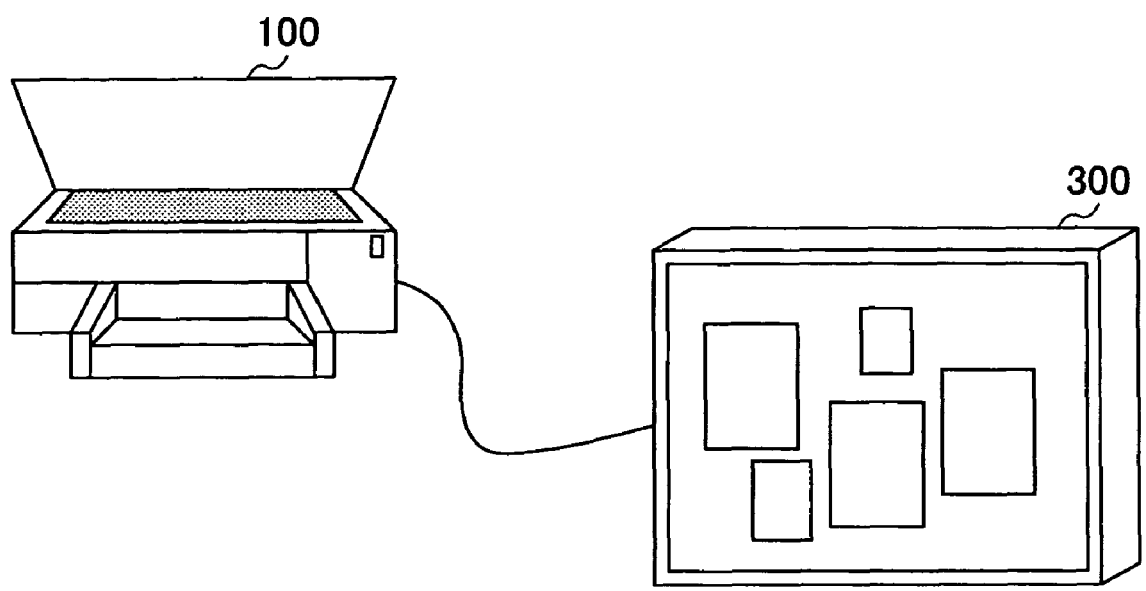
FIG. 32 is an outside drawing of an information display system according a second embodiment.

As shown in FIG. 32, in an information display system according to a second embodiment, an information issue device and an information management device are integrated in a single device, which is connected to a separate information display device via a network in a wired or wireless manner.

Accordingly, image information to be displayed can be managed in a centralized manner with a single device, while plural information display devices are distributed in remote locations.

Figure 33:
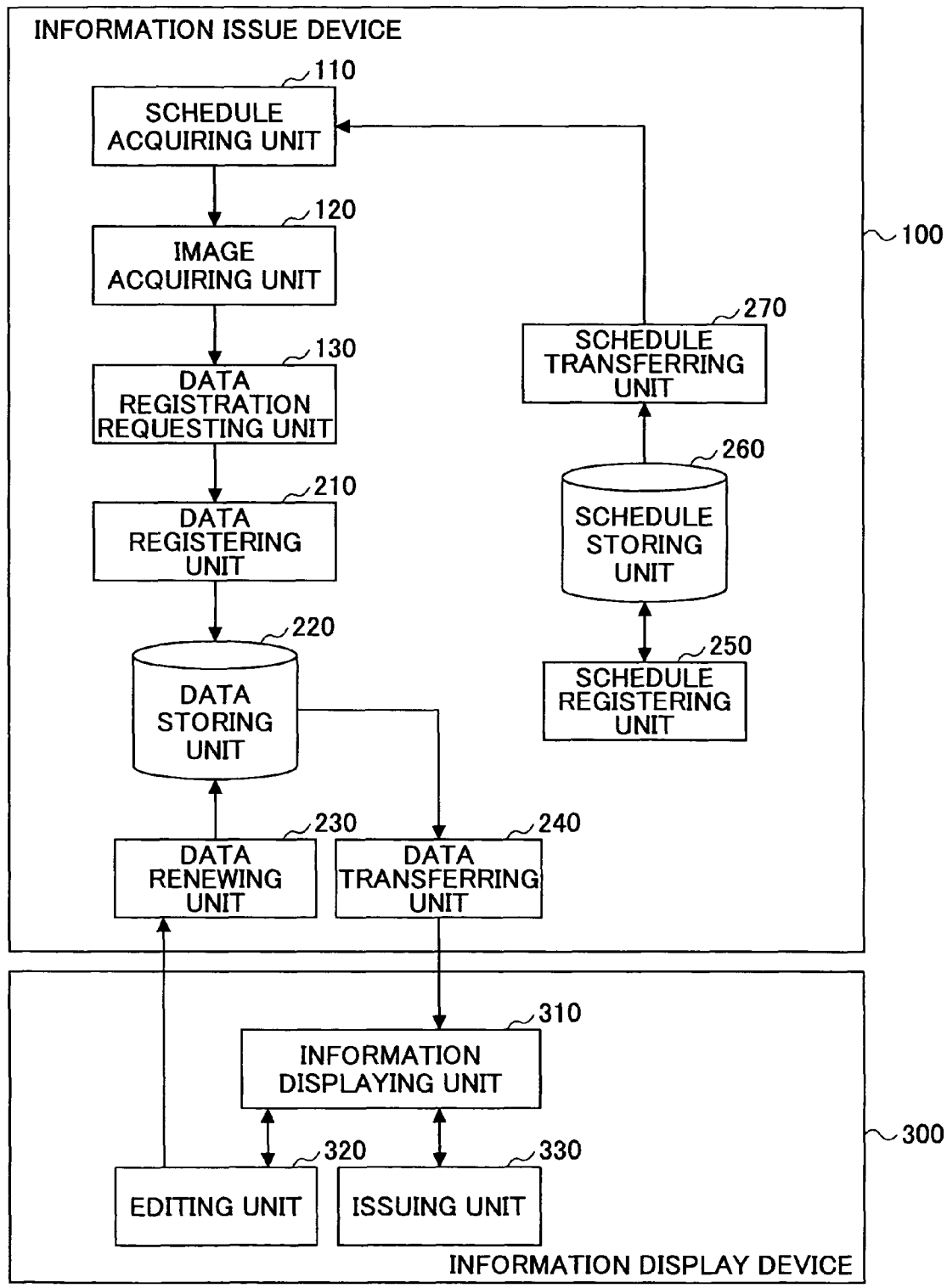
FIG. 33 is a functional block diagram of each of the devices in the information display system according to the second embodiment.

FIG. 33 is a functional block diagram of each of the devices in the information display system according to the second embodiment. In FIG. 33, elements corresponding to those in FIG. 3 are denoted by the same reference numbers, and are not further described.

In the first embodiment, data are exchanged between the data registration requesting unit 130 and the data registering unit 210, and between the schedule transferring unit 270 and the schedule acquiring unit 110 via the network 400. However, in the second embodiment, the data are exchanged directly.

As an opposite case to the above, the information display system can include plural information issue devices that are geographically distributed, and the information management device and the information display device can be integrated in a single device. Accordingly, plural users in remote locations can use a single display device at each location.

Figure 34:
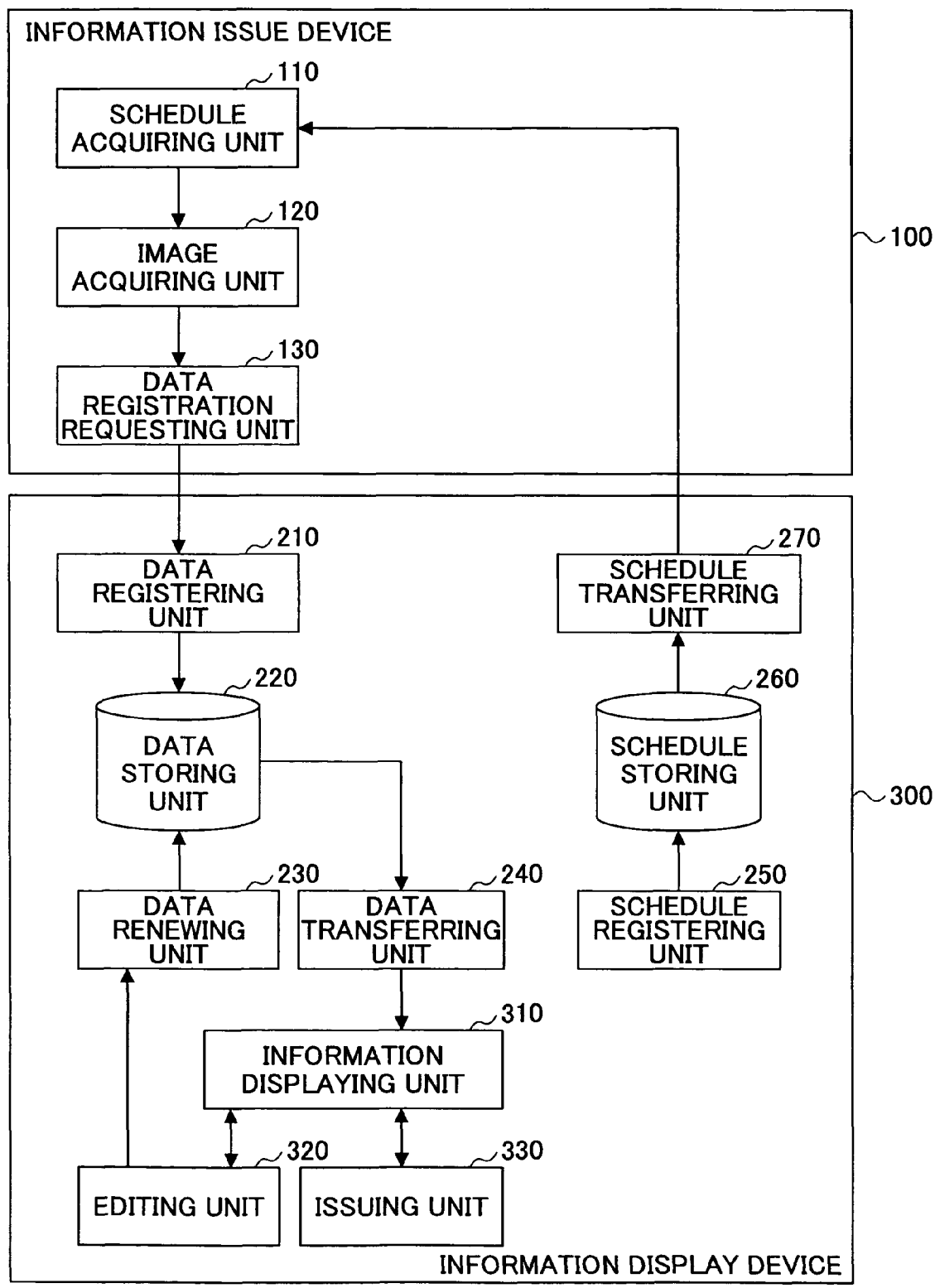
FIG. 34 is a functional block diagram of each of the devices in another example of the information display system according to the second embodiment.

FIG. 34 is a functional block diagram of each of the devices in another example the information display system according to the second embodiment. In FIG. 34, elements corresponding to those in FIG. 3 are denoted by the same reference numbers, and are not further described.

In the first embodiment, data are exchanged between the editing unit 320 and the data renewing unit 230, and between the data transferring unit 240 and the information displaying unit 310 via the network 400. However, in the second embodiment, the data are exchanged directly.

Third Embodiment

Figure 35:
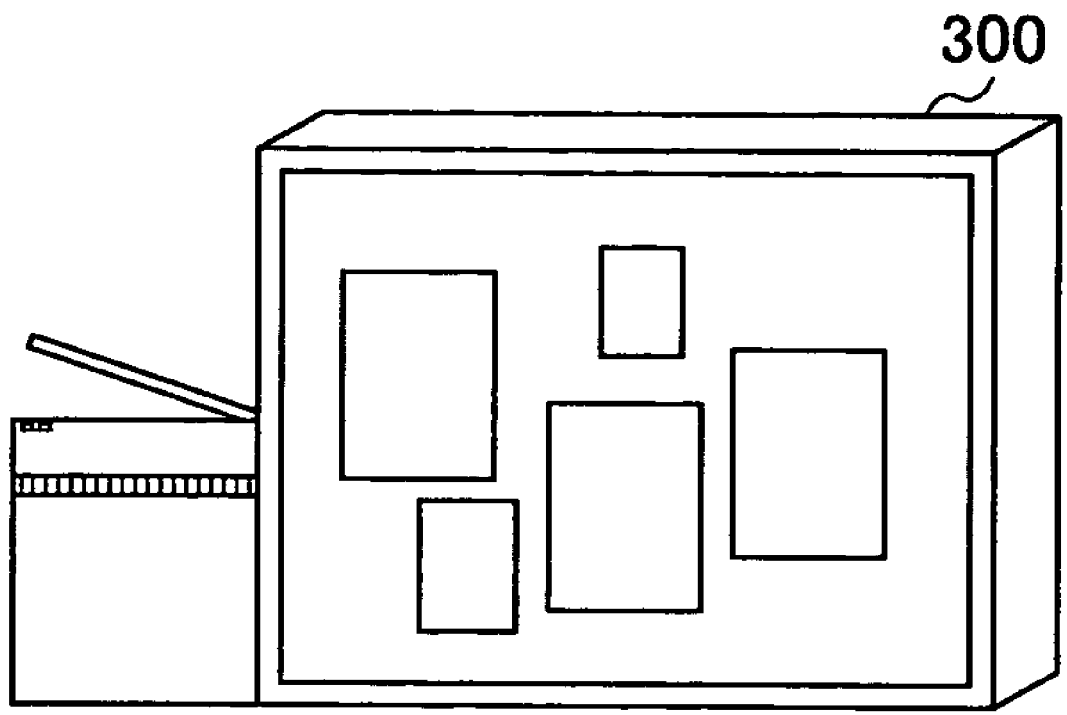
FIG. 35 is an outside drawing of an information display system according a third embodiment.

In the information display systems according to the first and second embodiments, the information issue device, the information management device, and the information display device are connected via the network. However, in an information display system according to the third embodiment, the information issue device, the information management device, and the information display device are integrated in a single device, as shown in FIG. 35.

Figure 36A:
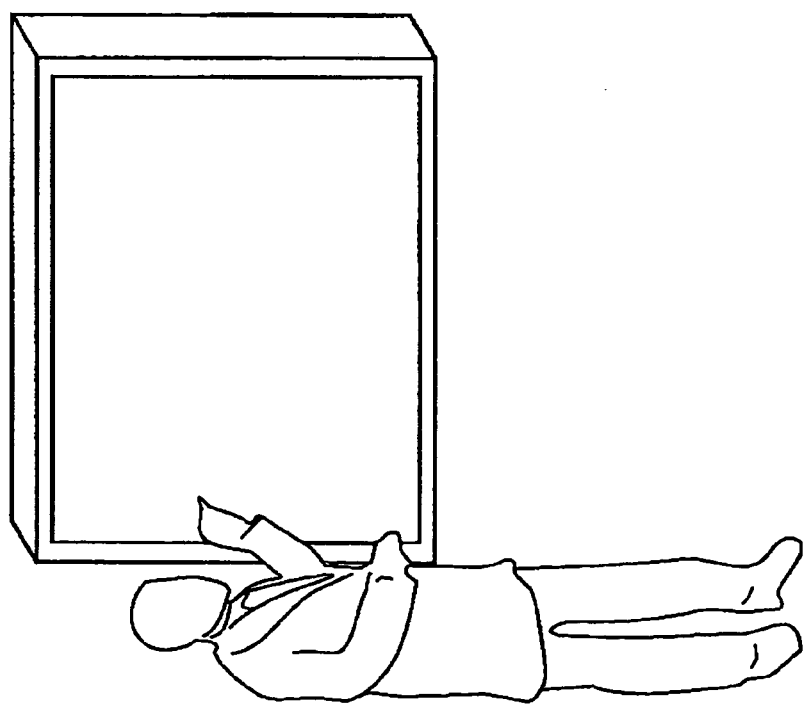
FIGS. 36A, 36B, 36C are examples of different types of the information display unit.

In the above described embodiments, the information display device is a relatively large display device such as a liquid crystal display or a plasma display (FIG. 36A).

Figure 36B:
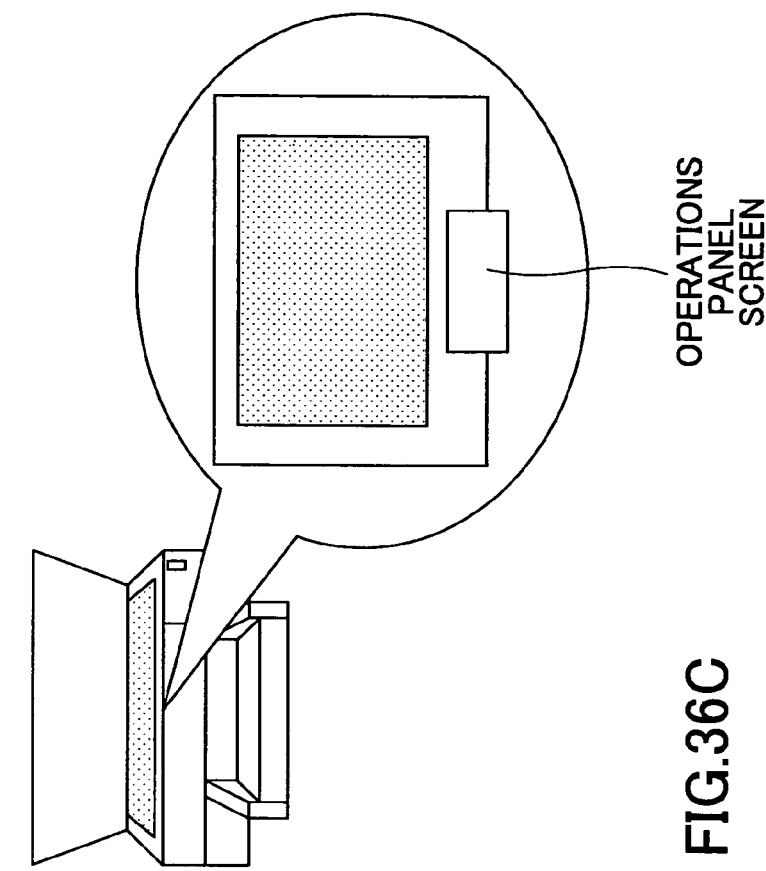

However, the information display device according to the present invention is not limited to a large device. The information display device can be an operations panel surface of a multifunction machine, a copier, a printer, etc. (FIG. 36B), an electronic billboard on which character strings are scrolled (FIG. 36C), or a display screen of a mobile phone or a PDA (Personal Digital Assistant).

Figure 36C:
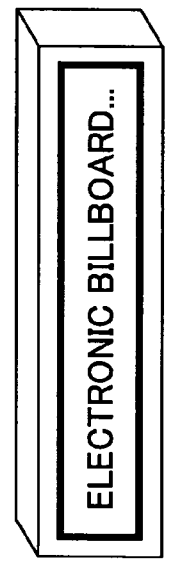
Figure 37:
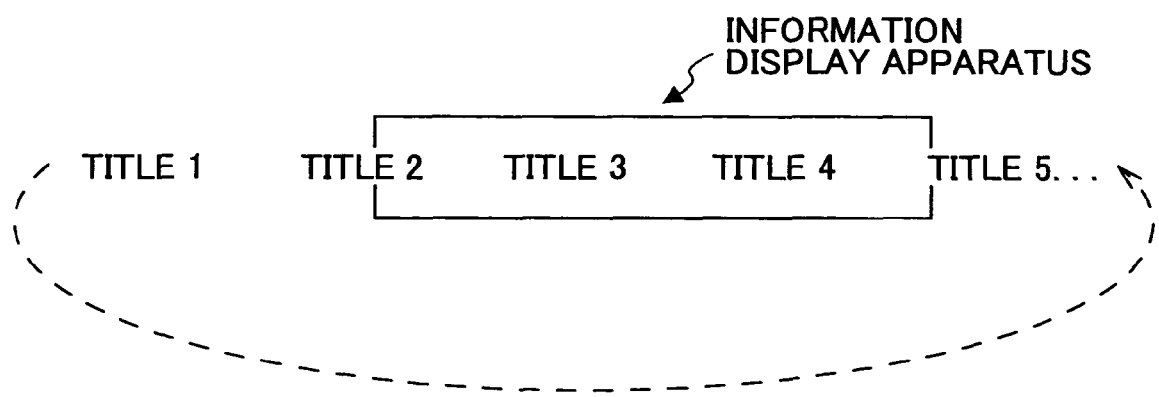
FIG. 37 is an example of character strings being scrolled on the information display unit.

When the information display device is an electronic billboard as shown in FIG. 36C (e.g., a guide board at a train station), information such as "title" or "schedule" stored in the data storing unit 220 is sequentially scrolled (in a flowing manner) on the display screen. In this case, after the last information item "title 5" is displayed, the first information item "title 1" is displayed, which is repeated sequentially, as shown in FIG. 37.

When a user wants to know details of information, the user can touch a "title" being displayed, so as to output image information corresponding to the "title" to a printer or a recording medium connected via a network.

Program or Recording Medium for Realizing Functions of Above Embodiments

The present invention is not limited to the embodiments described above. The functions of the information display system and the information display device described in the above embodiments can be programmed, and the programs can be written in a recording medium. The programs recorded in the recording medium can be loaded in a memory or a storage unit provided in a computer. Objects of the present invention can be achieved by executing the programs with the computer. The programs read from the recording medium may facilitate realizing the functions of the above-described embodiments, and therefore, the programs and the recording medium recording the programs are also included in the present invention.

The programs may facilitate realizing functions of the above-described embodiments in cooperation with an operating system or another application program, according to instructions of the programs.

The programs that may facilitate realizing the functions of the above-described embodiments can be provided in any type of recording medium, such as a disk (magnetic disk, optical disk), a card (memory card, optical card), a semiconductor memory (ROM, non-volatile memory), and a tape (magnetic tape, cassette tape). The programs can be directly supplied from a storage unit of a server computer via a network. In this case, the storage unit of the server computer is included in the recording medium of the present invention.

As described above, by programming the functions of the embodiments, and distributing the programs, it is possible to reduce cost and enhance portability and versatility.

The above-described embodiments can be applied to the following examples.

(1) Advertisements at Train Stations

An information issue device and an information management device are provided at a train station, and a person in charge of advertisements manages these devices. Further, plural information display devices are provided in predetermined locations at the train station. The person in charge of advertisements takes information from companies willing to post an advertisement such as advertisement data, display schedule, and display locations.

Each information display device acquires advertisement data from the information management device connected via a network, and displays the advertisement at a specified position, in a specified size, and rotated by a specified angle, in accordance with the display format of the information display device at a predetermined location.

(2) Issue/Display Advertisements at Distributed Locations

For example, information issue devices and information display devices are provided at remote locations, and an information management device manages information (advertisements) received from the information issue devices in a centralized manner.

A particular information issue device registers information to be displayed on a designated information display device at a remote location. The information display device acquires the registered information to be displayed therein from the information management device, and displays the information.

In this example, an advertiser from overseas can display an advertisement on an information display device at an appropriate location in Japan.

Further, when a disaster occurs, victims and friends/family of the victims can display messages to each other on information display devices installed near the recipient from remote locations.

According to one embodiment of the present invention, sequential operations starting from issuing information to displaying the information and operations for updating a validity period can be performed by a one-touch operation, and therefore, operations for displaying electronic information are facilitated.

Moreover, by using a display operation interface that can display image information in a zoomed-in condition or in a calendar format, capabilities in managing and handling displayed electronic information are enhanced.

Furthermore, by identifying the user, troublesome operations such as inputting/selecting schedule items can be eliminated, and therefore the workload of operating the information can be reduced in comparison to the conventional technology.

Moreover, by identifying the user, it is possible to display or acquire only the information relevant to a specific user. In the case of plural users, it is also possible to display or acquire only the information relevant to specific users.

The present invention is not limited to the specifically disclosed embodiment, and variations and modifications may be made without departing from the scope of the present invention.

The present application is based on Japanese Priority Patent Application No. 2005-252215, filed on Aug. 31, 2005, the entire contents of which are hereby incorporated by reference.

What is claimed is:

1. An information display system, comprising:
an information issue device configured to acquire a plurality of image information items to be displayed;
an information management device configured to manage the plurality of image information items to be displayed; and
an information display device configured to display the plurality of image information items, wherein the information issue device, the information management device, and the information display device are interconnected by a network, and
the information issue device includes
a schedule acquiring unit configured to acquire user-requested schedule information items;
an image acquiring unit configured to acquire the plurality of image information items, each of the plurality of image information items is acquired as a document in an electronic format; and
a data registration requesting unit configured to send the schedule information items and the plurality of image information items to the information management device so as to be registered and managed, wherein
the information management device includes a data registering unit configured to register the plurality of image information items and the schedule information items received from the data registration requesting unit in a data storing unit, each of the plurality of image information items is registered in association with a schedule information item,
and the information display device includes an information displaying unit configured to acquire the schedule information items and the plurality of image information items stored in the data storing unit, and display each of the image information items according to the associated schedule information item, and wherein
the information display device further comprises an issuing unit configured to perform a zoom-in process on the plurality of image information items displayed by the information displaying unit, the issuing unit
magnifies a designated image information item so as to be displayed in a middle part of the information displaying unit,
reduces a size of the plurality of image information items displayed by the information displaying unit other than the designated image information item in proportion to relative distances between the plurality of image information items displayed other than the designated image information item and the designated image information item, and
shifts the plurality of image information items displayed other than the designated image information item in inverse proportion to the relative distances between the plurality of image information items displayed other than the designated image information item and the designated image information item.

2. The information display system according to claim 1, wherein
the information management device further includes a schedule storing unit, configured to temporarily store user-specified schedule information item before being registered in the data storing unit by the data registering unit, and the schedule acquiring unit acquires the schedule information item from the schedule storing unit.

3. The information display system according to claim 2, wherein the information issue device further comprises:
a user recognizing unit configured to recognize at least one user ID, the user ID being unique to each user; wherein the schedule acquiring unit acquires, from the schedule storing unit, only a schedule information item that corresponds to the user ID recognized by the user recognizing unit.

4. The information display system according to claim 3, wherein the information displaying unit displays each of the plurality of image information items according to the schedule information item that corresponds to the user ID recognized by the user recognizing unit among the schedule information items stored in the schedule storing unit.

5. The information display system according to claim 1, wherein the information displaying unit can be operated in a regular display mode in which the plurality of image information items are displayed, or in a calendar display mode in which the schedule information item is displayed in a calendar format.

6. The information display system according to claim 5, wherein the information display device further comprises:
an editing unit configured to edit a position and a size of the plurality of image information items displayed by the information displaying unit, and update the plurality of image information items stored in the data storing unit.

7. The information display system according to claim 1, wherein the issuing unit cancels the zoom-in process on the plurality of image information items in response to an area other than the plurality of image information items being specified.

8. The information display system according to claim 1, wherein the registered schedule information item includes an issue date and a display limit.

9. The information display system according to claim 1, wherein the information management device further comprises a schedule transferring unit configured to extract the schedule information item corresponding to a predetermined schedule acquisition period set in the data storing unit and send only the extracted schedule information item to the information issue device.

10. An information display method for displaying image information being managed, the method comprising the steps of:
(a) acquiring user-requested schedule information items;
(b) acquiring a plurality of image information items, each of the plurality of image information items is acquired as a document in an electronic format;
(c) registering the plurality of image information items and the schedule information items in a data storing unit, each of the plurality of image information items is registered in association with a schedule information item;
(d) acquiring the schedule information items and the plurality of image information items stored in the data storing unit, and displaying each of the plurality of image information items according to the associated schedule information item; and
(h) performing a zoom-in process on the plurality of image information items displayed at the step (d), wherein the step (h) includes magnifying a designated image information item so as to be displayed in a middle part of a screen, reducing a size of the plurality of image information items displayed on the screen other than the designated image information item in proportion to relative distances between the plurality of image information items displayed other than the designated image information item and the designated image information item, and shifting the plurality of image information items displayed other than the designated image information item in inverse proportion to the relative distances between the plurality of image information items displayed other than the designated image information item and the designated image information item.

11. The information display method according to claim 10, further comprising a step of:
(e) temporarily storing user-specified schedule information item before being registered in the data storing unit at the step (c), wherein
the step (a) includes acquiring the schedule information item temporarily stored at the step (e).

12. The information display method according to claim 11, further comprising a step of:
(f) recognizing at least one user ID, the user ID being unique to each user; wherein
the step (a) includes acquiring only a schedule information item temporarily stored at step (e) that corresponds to the user ID recognized at the step (f).

13. The information display method according to claim 10, wherein the step (d) includes displaying the plurality of image information items in a regular display mode, or displaying the schedule information item in a calendar display mode.

14. The information display method according to claim 13, further comprising a step of:
(g) editing a position and a size of the plurality of image information items displayed at the step (d), and updating the plurality of image information items stored in the data storing unit.

15. The information display method according to claim 10, wherein the step (h) includes cancelling the zoom-in process on the plurality of image information items in response to an area other than the plurality of image information items being specified.

16. The information display method according to claim 10, wherein the step (c) includes registering an issue date and a display limit as the schedule information item in the data storing unit.

17. The information display method according to claim 10, wherein the step (d) includes extracting the schedule information item corresponding to a predetermined schedule acquisition period set in the data storing unit.

18. An information display apparatus for displaying image information being managed, the apparatus comprising:
a schedule acquiring unit configured to acquire user-requested schedule information items;
an image acquiring unit configured to acquire a plurality of image information items, each of the plurality of image information items is acquired as a document in an electronic format;
a data registering unit configured to register the plurality of image information items and the schedule information items in a data storing unit, each of the plurality of image information items is registered in association with a schedule information item;
an information displaying unit configured to acquire the schedule information items and the plurality of image information items item stored in the data storing unit, and display each of the plurality of image information items according to the associated schedule information item; and
an issuing unit configured to perform a zoom-in process on the plurality of image information items displayed by the information displaying unit, the issuing unit
magnifies a designated image information item so as to be displayed in a middle part of the information displaying ,unit,
reduces a size of the plurality of image information items displayed by the information displaying unit other than the designated image information item in proportion to relative distances between the plurality of image information items displayed other than the designated image information item and the designated image information item, and
shifts the plurality of image information items displayed other than the designated image information item in inverse proportion to the relative distances between the plurality of image information items displayed other than the designated image information item and the designated image information item.

19. The information display apparatus according to claim 18, wherein the registered schedule information item includes an issue date and a display limit.

20. The information display apparatus according to claim 18, further comprising a schedule transferring unit configured to extract the schedule information item corresponding to a predetermined schedule acquisition period set in the data storing unit and send only the extracted schedule information item to the schedule acquiring unit.

* * * * *